US011783218B2

(12) United States Patent
Chrostowski et al.

(10) Patent No.: US 11,783,218 B2
(45) Date of Patent: Oct. 10, 2023

(54) ELECTROMAGNETIC WAVE RESONATOR TUNING

(71) Applicant: THE UNIVERSITY OF BRITISH COLUMBIA, Vancouver (CA)

(72) Inventors: Lukas Chrostowski, Vancouver (CA); Jeff Young, Vancouver (CA); Jingda Wu, Vancouver (CA); Xiruo Yan, Vancouver (CA); Chang Ge, Vancouver (CA)

(73) Assignee: THE UNIVERSITY OF BRITISH COLUMBIA, Vancouver (CA)

( * ) Notice: Subject to any disclaimer, the term of this patent is extended or adjusted under 35 U.S.C. 154(b) by 509 days.

(21) Appl. No.: 17/054,128

(22) PCT Filed: May 9, 2019

(86) PCT No.: PCT/CA2019/050614
§ 371 (c)(1),
(2) Date: Nov. 9, 2020

(87) PCT Pub. No.: WO2019/213764
PCT Pub. Date: Nov. 14, 2019

(65) Prior Publication Data
US 2021/0117846 A1 Apr. 22, 2021

Related U.S. Application Data

(60) Provisional application No. 62/669,900, filed on May 10, 2018.

(51) Int. Cl.
G06N 10/00 (2022.01)
G02B 1/00 (2006.01)
(Continued)

(52) U.S. Cl.
CPC ............. *G06N 10/00* (2019.01); *G02B 1/005* (2013.01); *G02B 6/1225* (2013.01); *G02B 26/007* (2013.01); *B82Y 20/00* (2013.01)

(58) Field of Classification Search
CPC ...... G02N 10/00; G02B 1/005; G02B 6/1225; G02B 26/007; G02B 6/3546;
(Continued)

(56) References Cited

U.S. PATENT DOCUMENTS

2002/0048422 A1 4/2002 Cotteverte
2003/0026570 A1 2/2003 Malsuura
(Continued)

FOREIGN PATENT DOCUMENTS

WO WO1996/07949 A1 3/1996
WO WO9607949 A1 3/1996
(Continued)

OTHER PUBLICATIONS

Minkov, M., Savona, V. "Automated optimization of photonic crystal slab cavities," Sci Rep 4, 5124 (2014).
(Continued)

Primary Examiner — Collin X Beatty
(74) Attorney, Agent, or Firm — Raven Patents, LLC; Anton E. Skaugset

(57) ABSTRACT

An apparatus for facilitating electromagnetic wave resonator tuning is disclosed, including first, second, and third spaced apart resonator portions, the second portion disposed between the first and third to form an electromagnetic wave resonator having a resonant frequency, wherein the first and second portions define a first volume therebetween and the second and third define a second volume therebetween, a first actuator coupled to the first portion, the second, or both, the first actuator configured to adjust a width of the first volume, and a second actuator coupled to the second por-
(Continued)

tion, the third, or both, the second actuator configured to adjust a width of the second volume, wherein the actuators are configured to decrease the widths of the first and second volumes or increase the widths of the first and second volumes to adjust the resonant frequency of the resonator. Other apparatuses, methods, and systems are also disclosed.

20 Claims, 18 Drawing Sheets

(51) Int. Cl.
*G02B 6/122* (2006.01)
*G02B 26/00* (2006.01)
*B82Y 20/00* (2011.01)

(58) Field of Classification Search
CPC .... G02B 2006/121; G02B 2006/12173; G02B 26/001; G02B 26/0808; G02B 6/12002; G02B 6/1221; G02B 6/1223; G02B 6/125; G02B 6/132; G02B 6/138; G02B 6/351; G02B 6/3534; G02B 6/3538; G02B 6/3556; G02B 6/357; G02B 6/3572; G02B 6/3578; G02B 6/3582; G02B 6/3584; G02B 6/3596; G02B 6/43; B82Y 20/00; G02F 2202/32; G02F 1/011; G02F 1/0128; G02F 1/0147; G02F 1/025; G02F 1/1365; G02F 2202/104; G02F 2202/105; G02F 1/01; G02F 1/0152; G02F 1/21
USPC .......................................... 359/107, 108, 322
See application file for complete search history.

(56) References Cited

U.S. PATENT DOCUMENTS

| | | |
|---|---|---|
| 2004/0080726 A1 | 4/2004 | Suh |
| 2004/0085608 A1 | 5/2004 | Theil |
| 2005/0078902 A1* | 4/2005 | Beausoleil ............ G02B 6/1225 385/14 |
| 2005/0111815 A1 | 5/2005 | Kimura |
| 2005/0185966 A1 | 8/2005 | Salib |
| 2005/0259999 A1* | 11/2005 | Covey ....................... G02F 3/00 398/188 |
| 2006/0051042 A1 | 3/2006 | Noda |
| 2010/0288341 A1 | 11/2010 | Kim |
| 2013/0026570 A1 | 1/2013 | Fan |
| 2013/0121633 A1* | 5/2013 | Painter ................. G02B 26/001 385/14 |
| 2013/0294722 A1* | 11/2013 | Vuckovic ................ G02F 1/365 385/14 |
| 2016/0202414 A1* | 7/2016 | Englund .............. G02B 6/1225 264/1.24 |

FOREIGN PATENT DOCUMENTS

WO  WO2014/107696 A1  7/2014
WO  WO2019/213764 A1  11/2019

OTHER PUBLICATIONS

Xiongyeu Chew, Guangya Zhou, Fook Siong Chau, Jie Deng, "Enhanced resonance tuning of photonic crystal nanocavities by integration of optimized near-field multitip nanoprobes," J. Nanophoton. 5(1) 059503 (Jan. 1, 2011).

Akahane, Y., Asano, T., Song, BS et al. "High-Q photonic nanocavity in a two-dimensional photonic crystal," Nature 425, 944-947 (2003).

Morse, K. J., Abraham, R. J. S., DeAbreu, A., Bowness, C., Richards, T. S., Riemann, H., Abrosimov, N. V., Becker, P., Pohl, H.-J., Thewalt, M. L. W., and Simmons, S., "A photonic platform for donor spin qubits in silicon," Science Advances 3, e1700930 (2017).

Miura R., et al. "Ultralow mode-volume photonic crystal nanobeam cavities for high-efficiency coupling to individual carbon nanotube emitters," Nature Comm. 2014, 5, 5580.

Zhang, Y., et al. A review for optical sensors based on photonic crystal cavities, Sens. Act. A 2015, 233, 374-389.

Eichenfield M. et al. "A picogram—and nanometre-scale photonic-crystal optomechanical cavity," Nature 2009,459, 550.

Paraiso T.K. et al. "Position-squared coupling in a tunable photonic crystal optimechanical cavity," Physical Review X. 2015.

Donglin Wang et al. "Ultrasmall modal volume and high Q factor optimization of a photonic crystal slab cavity," 2013 J. Opt. 15 125102.

* cited by examiner

ELECTROMAGNETIC WAVE RESONATOR TUNING

RELATED APPLICATION

This application claims the benefit of U.S. Provisional Application No. 62/669,900 entitled "ELECTROMAGNETIC WAVE RESONATOR TUNING", filed on May 10, 2018, which is hereby incorporated by reference herein in its entirety.

BACKGROUND

1. Field

Embodiments of this invention relate to electromagnetic wave resonators and more particularly to electromagnetic wave resonator tuning.

2. Description of Related Art

Electromagnetic wave resonators such as, for example, photonic crystal cavities may be used to strongly confine electromagnetic waves such as light. Such resonators may find applications in various areas of physics and engineering, including, for example, quantum information processing, lasers, and filters. Some applications of resonators may benefit from being able to tune or change the resonant frequency of the resonator. For example, some applications of resonators may require a precise resonant frequency or wavelength, which may be difficult to provide when manufacturing a resonator but may be achievable by tuning the resonator and thereby changing the resonant frequency after manufacturing. However, some known tunable resonators cannot be tuned without a severe drop in quality factor and/or an undesirable increase in modal volume.

SUMMARY

In accordance with various embodiments, there is provided an apparatus for facilitating electromagnetic wave resonator tuning. The apparatus includes first, second, and third spaced apart resonator portions, the second resonator portion disposed between the first and third resonator portions to form an electromagnetic wave resonator having a resonant frequency, wherein the first and second resonator portions define a first volume therebetween and the second and third resonator portions define a second volume therebetween. The apparatus includes a first actuator coupled to the first resonator portion, the second resonator portion, or both, the first actuator configured to adjust a width of the first volume, and a second actuator coupled to the second resonator portion, the third resonator portion, or both, the second actuator configured to adjust a width of the second volume. The first and second actuators are configured to decrease the widths of the first and second volumes or increase the widths of the first and second volumes to adjust the resonant frequency of the resonator.

The resonator may be centered in the second resonator portion.

The second resonator portion may include at least one outer portion having a width between the first and second volumes that increases as the at least one outer portion extends away from a center of the resonator along a central axis of the resonator.

Outer portions of the first and second volumes may each generally extend at an angle to the central axis of the resonator.

The angle may be about 60 degrees.

The first actuator may include a first deformable portion including a plurality of transversely spaced apart deformable beams coupled together and extending generally parallel with the central axis of the resonator and the second actuator may include a second deformable portion including a plurality of transversely spaced apart deformable beams coupled together and extending generally parallel with the central axis of the resonator.

The first deformable portion may be coupled to the first resonator portion and the second deformable portion may be coupled to the second resonator portion such that deformation of the first deformable portion is configured to adjust the width of the first volume and deformation of the second deformable portion is configured to adjust the width of the second volume.

The first and second deformable portions may be integral with the first, second, and third resonator portions.

The first volume may be generally reflection symmetric to the second volume across the central axis of the resonator.

The first, second, and third resonator portions may be first, second, and third photonic crystal portions and the resonator may be a photonic crystal cavity.

The first, second, and third photonic crystal portions may be 2D photonic crystal portions.

A single integral slab of substrate material may include the first, second, and third resonator portions.

The apparatus may include a first boundary portion spaced apart from the first resonator portion and defining a first boundary volume therebetween, and a second boundary portion spaced apart from the third resonator portion and defining a second boundary volume therebetween and the first and second boundary portions may be integral with the slab of substrate material.

The first actuator may be coupled between the first and second resonator portions and the second actuator may be coupled between the second and third resonator portions.

In accordance with various embodiments, there is provided a system for quantum information processing including a quantum information processor and any of the above described apparatuses.

In accordance with various embodiments, there is provided a method of manufacturing a tunable photonic crystal cavity. The method involves forming a plurality of holes in a slab such that a photonic crystal comprising the slab and the plurality of holes is provided, cutting the slab to define spaced apart first, second, and third photonic crystal portions of the photonic crystal, the second photonic crystal portion disposed between the first and third photonic crystal portions to form a photonic crystal cavity having a resonant frequency, wherein the first and second photonic crystal portions define a first volume therebetween and the second and third photonic crystal portions define a second volume therebetween, coupling a first actuator to the first photonic crystal portion, the second photonic crystal portion, or both, the first actuator configured to adjust a width of the first volume, and coupling a second actuator to the second photonic crystal portion, the third photonic crystal portion, or both, the second actuator configured to adjust a width of the second volume, wherein the first and second actuators are configured to decrease the widths of the first and second volumes or increase the widths of the first and second volumes to adjust the resonant frequency of the photonic crystal cavity.

Cutting the slab to define the first, second, and third photonic crystal portions, may involve cutting the slab such that the photonic crystal cavity is centered in the second photonic crystal portion.

Cutting the slab to define the first, second, and third photonic crystal portions may involve cutting the slab such that the second photonic crystal portion includes at least one outer portion having a width between the first and second volumes that increases as the at least one outer portion extends away from a center of the photonic crystal cavity along a central axis of the photonic crystal cavity.

Cutting the slab to define the first, second, and third photonic crystal portions may involve cutting the slab such that outer portions of the first and second volumes each generally extend at an angle to the central axis of the photonic crystal.

The angle may be about 60 degrees.

Other aspects and features of embodiments of the invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
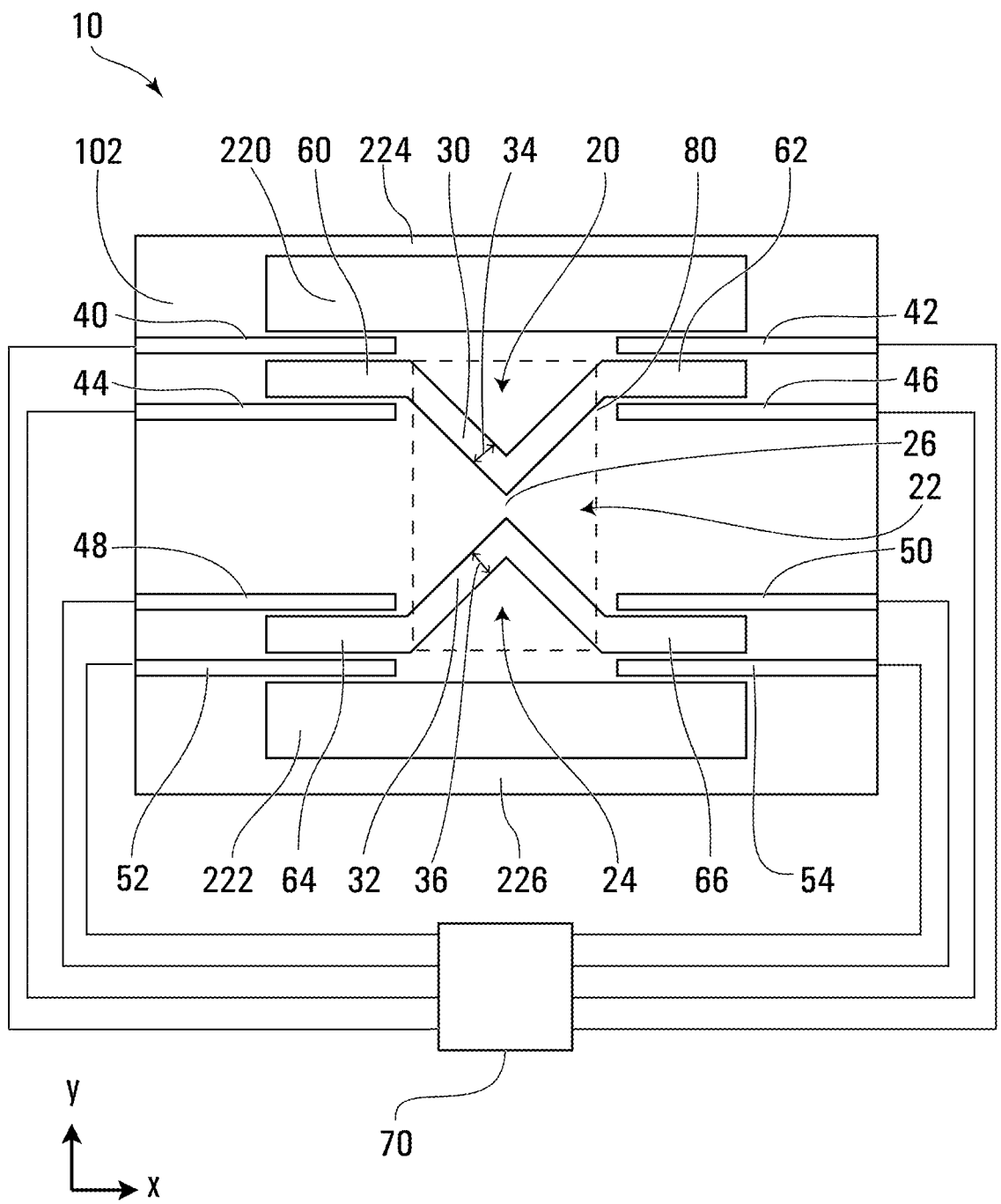
FIG. 1 is a schematic representation of an apparatus for facilitating electromagnetic wave resonator tuning according to various embodiments of the invention.

Electromagnetic wave resonators, such as photonic crystal cavities, may be used in various areas of physics and engineering, including, for example, in a range of high-precision integrated optics applications, such as quantum information processing, lasers, and filters.

For some applications it may be desirable to be able to tune or change the resonant frequency of an electromagnetic wave resonator. For example, some applications may require high quality factor and low modal volume electromagnetic wave resonators having precise resonant frequencies, which may be beyond the precision that can be achieved due to manufacturing errors or tolerances. Therefore, it may be desirable to be able to tune a resonator after manufacturing to correct for an imprecise resonant frequency associated with the resonator.

For example, some manufacturing tolerances for photonic crystal cavities may result in photonic crystal cavities having resonant wavelengths that vary by several nm at optical or near infrared wavelengths, and it may be desirable to be able to tune or change the resonant frequency of a photonic crystal cavity by several nm to correct the resonant wavelength of the resonator. The optical mode of a photonic crystal cavity is determined by its dielectric distribution $\varepsilon(r)$, and therefore its resonance can be altered by perturbing $\varepsilon(r)$. In some embodiments, $\varepsilon(r)$ may be perturbed by physically moving elements of the photonic crystal cavity and/or elements that interact with the photonic crystal cavity. In some embodiments, the tunability of a cavity's resonance frequency can be quantified or parameterized with an optomechanical coefficient $g_{om} = dv_o/dx$, where $v_o$ is the resonant frequency and $dx$ is the displacement of the perturbed geometry. In various embodiments, a tunable resonator may have a high optomechanical coefficient $g_{om}$. In some embodiments, a tuning/shifting coefficient such as $d\lambda/dx$ may be used to quantify or parameterize the tunability of a resonator.

For many applications, the resonant frequency of a resonator is not the only important property of the resonator. Some important properties of a photonic crystal cavity used in high-precision integrated optics applications, such as quantum information processing, lasers, and filters, may include the quality factor (Q) of the photonic crystal cavity and the modal volume (V) of the photonic crystal cavity. For various applications, these properties must be maintained above or below respective threshold levels for the photonic crystal cavity to be useful and so, in various embodiments, a resonator with a tunable resonant frequency may be useful only if the quality factor and/or modal volume are kept above or below respective threshold levels during tuning.

Quality factor or Q for a resonator may be a dimensionless parameter that quantifies how underdamped a resonator is and characterizes a resonator's bandwidth relative to its center frequency or resonant frequency. In various embodiments, Q may be determined using the following equation:

$$Q \stackrel{def}{=} \frac{f_r}{\Delta f}$$

where $f_r$ is the resonance frequency of the resonator and $\Delta f$ is the full width at half maximum (FWHM) for a measurement of transmitted or scattered power versus frequency measured at an output of the resonator.

Modal volume or V may be a measure of how much light or electromagnetic radiation spreads out in a resonator and may be determined using the following equation determined over the volume of the resonator:

$$V = \frac{\int \varepsilon E^2 \, dV}{\max(\varepsilon E^2)}$$

where E is the electric field and ε is the permittivity of the materials of the resonator, both of which are position dependent.

In various applications, there may be minimum requirements for the quality factor of the resonator and/or for the modal volume of the resonator. For example, cavity quantum electrodynamic (cQED) approaches to chip-based quantum information processing may require the quality factor to be maintained above a threshold value, as to match the cavity bandwidth with the quantum emitter linewidth. Particularly, a cQED scheme such as one based on Se impurity centers in silicon may require the Q value to be maintained above $1 \times 10^5$. Notably, in various embodiments, high-Q resonators may have very narrow resonance bandwidth, which could be sensitive to fabrication defects.

In various embodiments, a modal volume that is smaller or equal to $(\lambda/n)^3$, may be preferable in cQED approaches to chip-based quantum information processing, where λ is the resonant wavelength inside the material of the photonic cavity and n is the refractive index of the material. In other applications, such as lasers, more general light emission devices, and nonlinear optical devices, for example, a large Q/V value may improve operation efficiency.

Referring to FIG. 1, there is provided a schematic representation of an apparatus 10 for facilitating electromagnetic wave resonator tuning, in accordance with various embodiments described herein. In various embodiments, the apparatus 10 may facilitate tuning or changing of the resonant frequency of an electromagnetic wave resonator while maintaining a high quality factor and/or low modal volume of the resonator. In some embodiments, the apparatus 10 may provide high Q and $g_{om}$ while maintaining a small V. In some embodiments, for example, the apparatus 10 may provide Q>about $1 \times 10^5$ and V<about $0.4 \, (\lambda/n)^3$ for mid-IR wavelengths of about 2.9 μm over a range of center wavelengths that can be tuned with a $g_{om}$ of about 15 GHz/nm or about 0.35 nm wavelength shift per 1 nm spatial movement using micro-electro-mechanical (MEMS) actuators between a center wavelength of about 2896 nm and a center wavelength of about 2908 nm (see for example, FIG. 5, discussed below). In various embodiments, the apparatus 10 shown in FIG. 1 may provide a benefit to a range of high-precision integrated optics applications that require individual tuning of on-chip high Q photonic crystal cavities, for example.

Referring to FIG. 1, the apparatus 10 includes first, second, and third spaced apart resonator portions 20, 22, and 24. The second resonator portion 22 is disposed between the first and second resonator portions 20 and 24 to form an electromagnetic wave resonator having a resonant frequency. In various embodiments, the first, second, and third spaced apart resonator portions 20, 22, and 24 may be photonic crystal portions, which together form a photonic crystal cavity acting as the resonator. For example, in some embodiments, the first, second and third spaced apart resonator portions 20, 22, and 24 may each include a silicon substrate having a pattern of holes or voids formed therein. In some embodiments, the holes or voids in the silicon substrate may be located only in a region 80 shown in FIG. 1. In various embodiments, the resonator may have its center 26 in the second resonator portion 22. In some embodiments, the resonator center 26 being in the second resonator portion 22 may facilitate tuning of the frequency of the resonator through movement of the first and third resonator portions 20 and 24 relative to the second resonator portion 22.

Referring still to FIG. 1, the first and second resonator portions 20 and 22 define a first volume 30 therebetween and the second and third resonator portions 22 and 24 define a second volume 32 therebetween. In some embodiments, the first and second volumes 30 and 32 may be voids in a substrate slab which may be filled with ambient air or vacuum, for example.

in various embodiments, the apparatus 10 may include a first actuator coupled to the first resonator portion 20, the second resonator portion 22, or both, the first actuator configured to adjust a width of the first volume 30. For example, referring still to FIG. 1, in various embodiments, the apparatus 10 may include a first set of metal plates 40 and 42 coupled to the first resonator portion 20 and a second set of metal plates 44 and 46 coupled to the second resonator portion 22. Application of a voltage between the first and second sets of metal plates 40 and 42 and 44 and 46 may cause the first and second sets of metal plates to move relative to one another. Accordingly, the first and second sets of metal plates 40 and 42 and 44 and 46 may act as a first actuator coupled to the first and second resonator portions 20 and 22. In various embodiments, the first actuator is configured to move the first resonator portion 20 relative to the second resonator portion 22 and the first actuator may be considered to be coupled between the first and second resonator portions 20 and 22.

In various embodiments, the apparatus 10 may include a second actuator coupled to the second resonator portion 22, the third resonator portion 24, or both, the second actuator configured to adjust a width of the second volume 32. For example, in various embodiments, the apparatus 10 may include a third set of metal plates 48 and 50 coupled to the second resonator portion 22 and a fourth set of metal plates 52 and 54 coupled to the third resonator portion 24. The third and fourth sets of metal plates 48 and 50 and 52 and 54 may act as a second actuator coupled to the second and third resonator portions 22 and 24. In various embodiments, the second actuator is configured to move the third resonator portion 24 relative to the second resonator portion 22 and the second actuator may be considered to be coupled between the second and third resonator portions 22 and 24.

Referring still to FIG. 1, the apparatus 10 may include a controller 70 configured to apply voltages to the first, second, third, and fourth sets of metal plates 40-54 to control widths 34 and 36 of the first and second volumes 30 and 32. In various embodiments, for example, the controller 70 may be configured to apply voltage differences between the metal plates 40 and 44, 42 and 46, 48 and 52, and 50 and 54 to cause the first and second resonator portions 20 and 22 and the second and third resonator portions 22 and 24 to be drawn together and thereby cause the widths 34 and 36 of the first and second volumes 30 and 32 to decrease, as shown, for example in FIG. 2.

In various embodiments, the movement of the first and third resonator portions 20 and 24 relative to the second resonator portion 22 and resulting change in widths 34 and 36 of the first and second volumes 30 and 32 may cause the resonant frequency of the resonator to be adjusted. In some embodiments, by reducing both the width 34 of the first volume 30 and the width 36 of the second volume 32, a general symmetry of the resonator may be maintained, and this may facilitate keeping the quality factor of the resonator relatively high and keeping the modal volume of the resonator relatively low, even as the resonant frequency of the resonator formed by the first, second, and third resonator portions 20, 22 and 24 changes.

Resonator Portions

Figure 3:
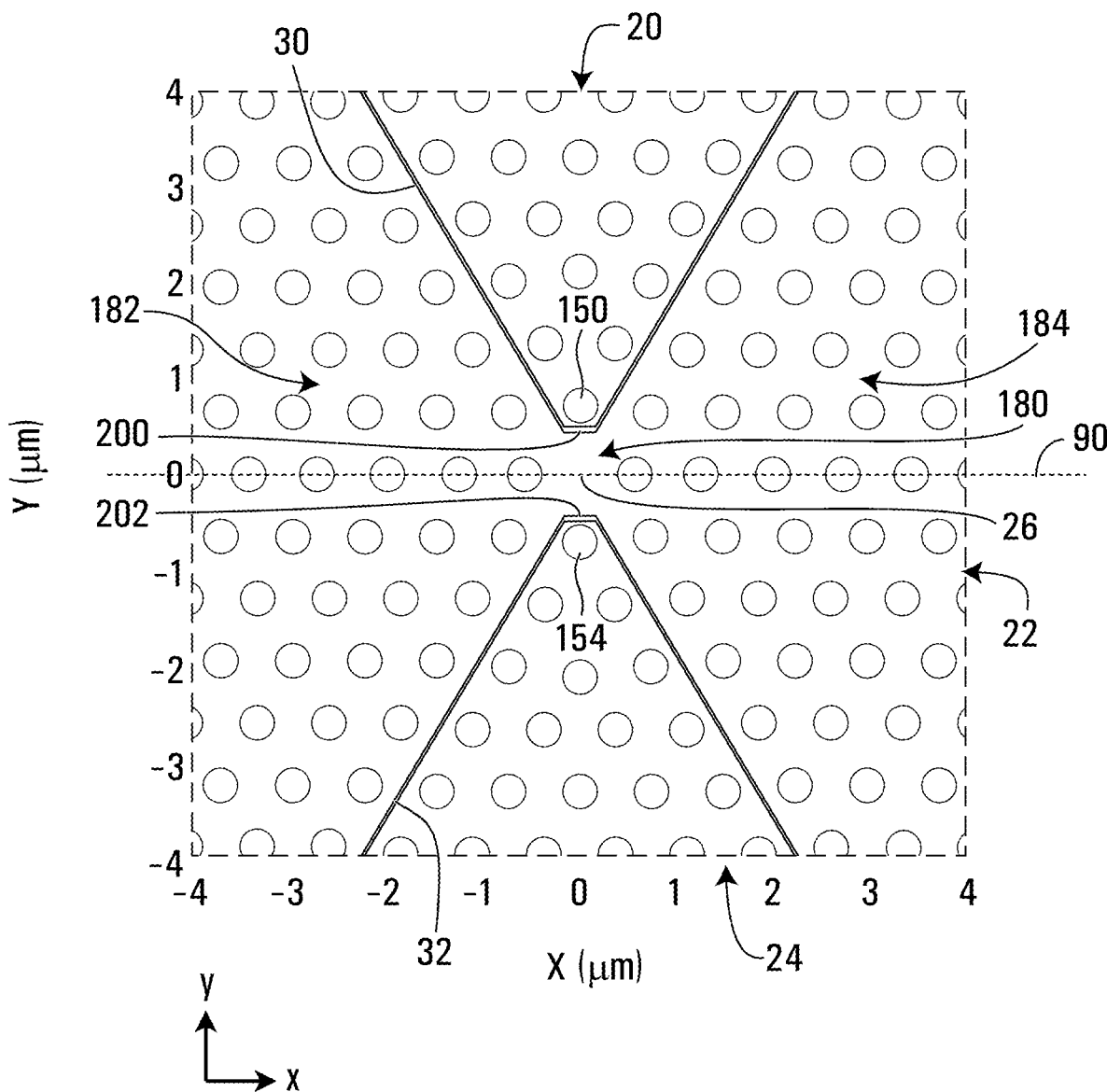
FIG. 3 is a detailed view of part of a region of the apparatus of FIG. 1 showing first, second, and third resonator portions included in the apparatus of FIG. 1 when the apparatus in a first configuration according to various embodiments of the invention.

As described above, in various embodiments, the first, second, and third resonator portions 20, 22, and 24 of the apparatus 10 shown in FIG. 1 may be photonic crystal portions. Referring now to FIG. 3, there is shown a detailed view of part of the region 80 depicted in FIG. 1 in accordance with various embodiments wherein each of the first, second, and third spaced apart resonator portions 20, 22, and 24 is a portion of a 2D photonic crystal cavity. In various embodiments, the 2D photonic crystal cavity formed by the first, second, and third resonator portions 20, 22 and 24 may have a center 26 of the photonic crystal cavity in the second resonator portion 22.

In various embodiments, a 2D photonic crystal cavity may include a 2 dimensionally generally periodic optical structure. For example, in some embodiments, a 2D photonic crystal cavity may include a generally planar substrate having holes cut or drilled therein in a generally periodic hole pattern such that the refractive index contrast between the substrate and the air in the holes and the symmetry in the hole pattern provides an electromagnetic wave resonator or photonic cavity. In some embodiments, the hole pattern may include offsets or perturbations in the locations of certain holes in the otherwise periodic structure which may result in an increased quality factor and/or reduced modal volume for the photonic crystal cavity.

Referring back to FIG. 1, in various embodiments, a single integral slab of substrate material 102 may include the first, second, and third resonator portions 20, 22, and 24. For example, in some embodiments, the slab 102 may be a 500 nm thick silicon slab substrate which has been machined to include the first, second, and third resonator portions 20, 22 and 24. In some embodiments, the thickness of the slab may be between about 200 and 500 nm. In various embodiments, the slab 102 may be machined to form a photonic crystal cavity, for example, by cutting or drilling holes in the silicon substrate. In some embodiments the holes may be cut in the silicon substrate using dry etching, for example. In various embodiments, by forming the first, second, and third resonator portions 20, 22, and 24 in a single integral piece of substrate material, the apparatus 10 may be manufactured more cost effectively and/or accurately.

Referring still to FIG. 3, in various embodiments, the first and second volumes 30 and 32 may be removed or cut from the slab 102 shown in FIG. 1 such that the first, second, and third resonator portions 20, 22, and 24 are spaced apart. Removal of the first and second volumes 30 and 32 to separate the first, second, and third resonator portions may facilitate movement of the first resonator portion 20 relative to the second resonator portion 22 and of the third resonator portion 24 relative to the second resonator portion 22 to adjust resonant frequency of the resonator. In some embodiments, the first and second volumes 30 and 32 may be cut from the slab using dry etching, for example.

Referring back to FIG. 1, in various embodiments, a first boundary volume or void 220 and a second boundary volume or void 222 may be removed or cut from the slab 102, such that the apparatus 10 includes a first boundary portion 224 spaced apart from the first resonator portion 20 and defining the first boundary volume therebetween and a second boundary portion 226 spaced apart from the third resonator portion 24 and defining the second boundary volume 222 therebetween. For example, in some embodiments, the first and second boundary volumes may be removed using dry etching. In various embodiments, removal of the first and second boundary volumes 220 and 222 from the slab 102 may allow movement of the first and third resonator portions 20 and 24 relative to the second resonator portion 22 by the first and second actuators. In some embodiments, including the first and second boundary portions 224 and 226 in the apparatus 10 may facilitate mounting of the apparatus 10 during use of the apparatus 10. For example, in some embodiments, the first and second boundary portions 224 and 226 may be held in one or more mounts to facilitate the apparatus 10 being used in a quantum information processing system.

In various embodiments, the apparatus 10 may be in a first or initial configuration shown in FIGS. 1 and 3 when the first and second actuators of the apparatus 10 have not moved the first and third resonator portions 20 and 24. In various embodiments, in the first configuration, most of the holes in the first and third resonator portions 20 and 24 may be offset in the positive and negative y-directions respectively from forming a uniform lattice with the holes in the second resonator portion 22. For example, in the embodiment shown in FIG. 3, the holes in the first resonator portion 20 may be generally offset by +40 nm in the y-direction from holes in the second resonator portion 22 and the holes in the third resonator portion 24 may be offset by −40 nm in the y-direction from holes in the second resonator portion 22.

Figure 4:
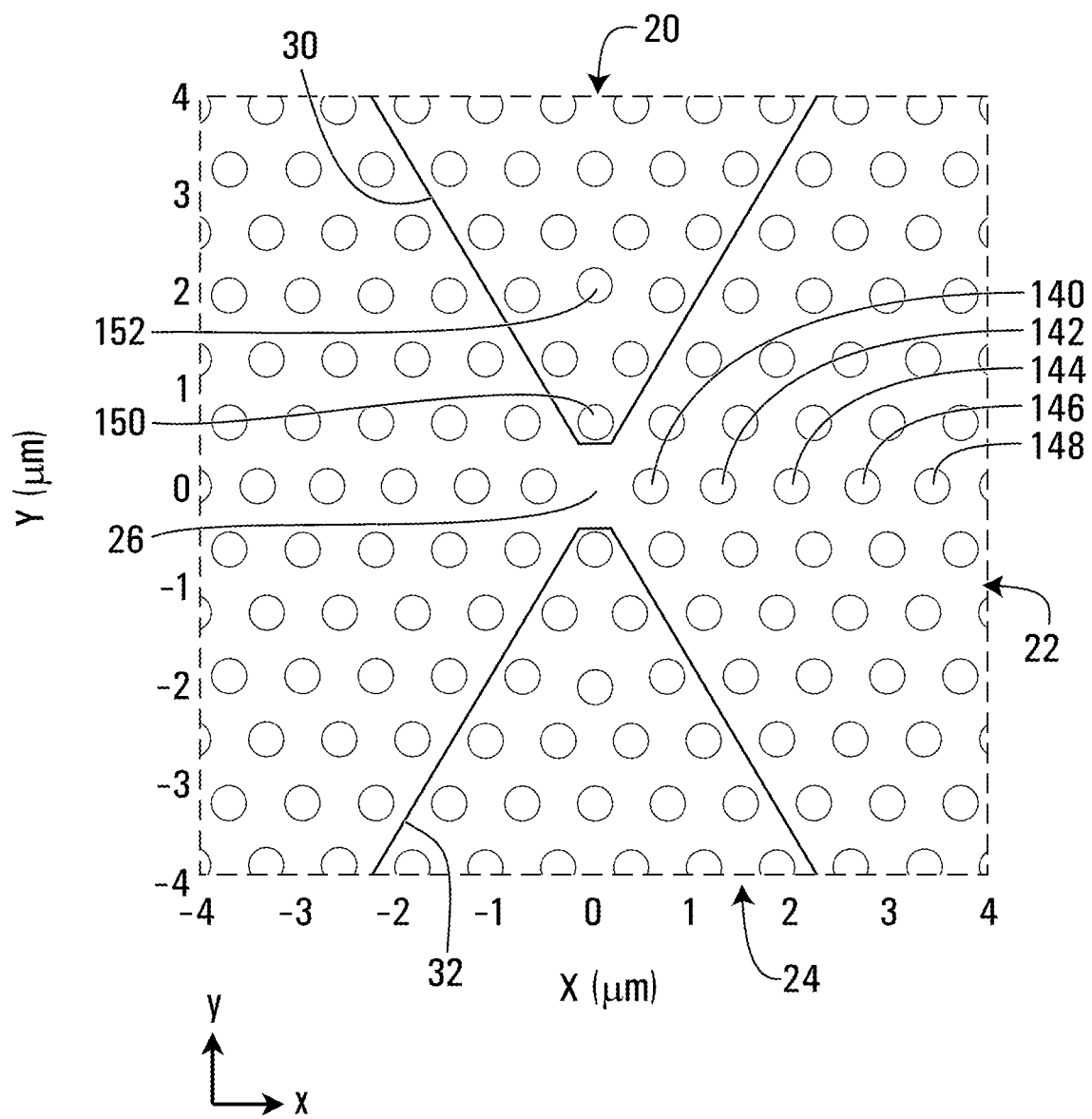
FIG. 4 is a detailed view of part of a region of the apparatus of FIG. 2 showing the first, second, and third resonator portions included in the apparatus of FIG. 2 when the apparatus in the second configuration according to various embodiments of the invention.

In various embodiments, the offsets may be changed by the controller 70 controlling the actuators shown in FIG. 1 to move the first and third resonator portions 20 and 24 in the negative and positive y-directions respectively relative to the second resonator portion 22. In some embodiments, the actuators shown in FIG. 1 may be configured to reduce the offset to 0 nm, for example, as shown in FIG. 4. In various embodiments when the offset is 0 nm, the lattice or hole pattern formed by the holes in the first, second, and third resonator portions 20, 22, and 24 may be a hole pattern that is known to provide a photonic crystal cavity having a high quality factor and low modal volume.

Figure 2:
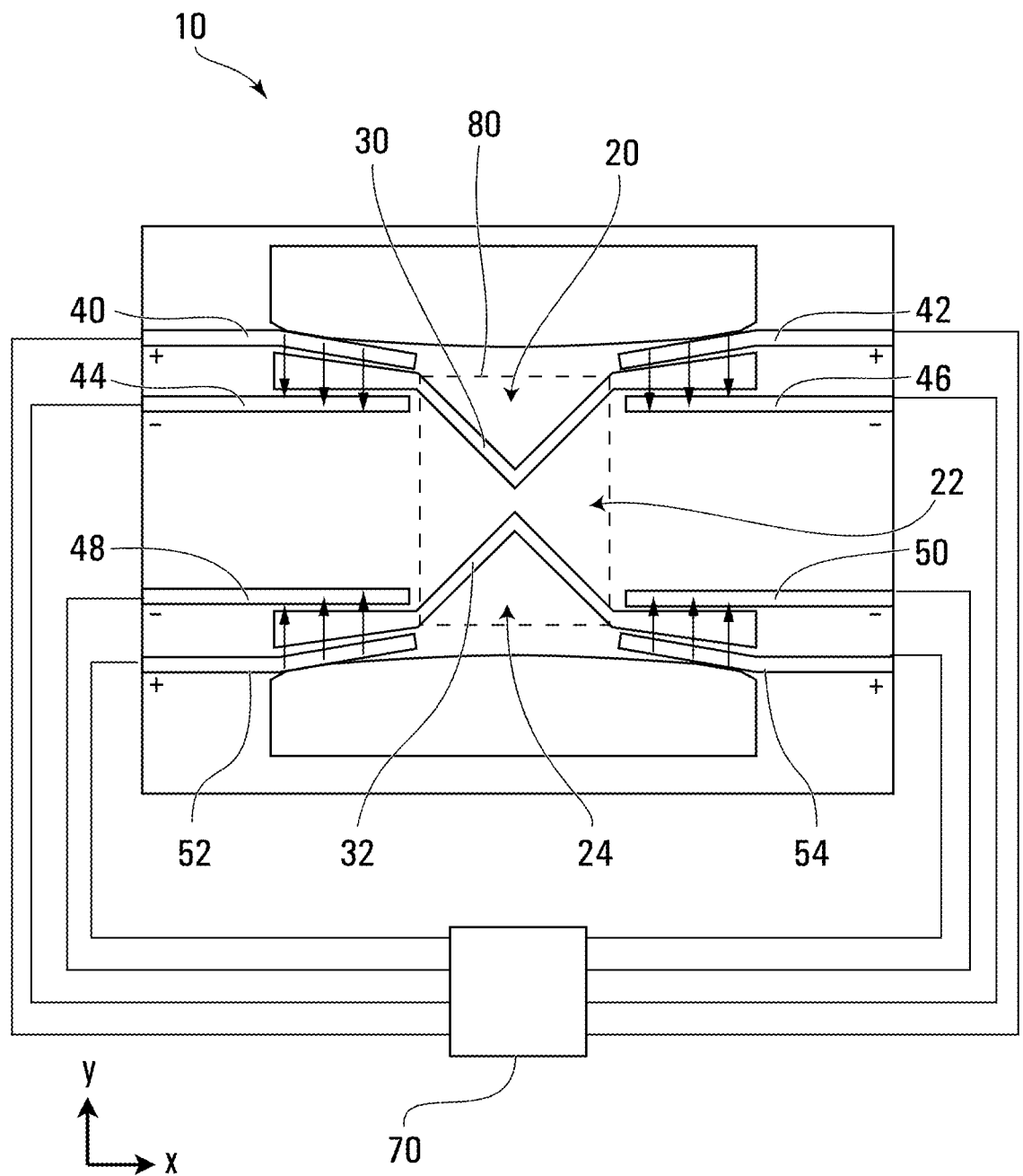
FIG. 2 is a schematic representation of the apparatus of FIG. 1 in a second configuration according to various embodiments of the invention.

Referring to FIG. 4, part of the region 80 is shown when the apparatus 10 is in a second configuration, wherein the first and second actuators of the apparatus 10 have moved the first and third resonator portions 20 and 24 towards the second resonator portion 22 as shown in FIG. 2. In the embodiment shown, the offsets of +40 nm and −40 nm from FIG. 3 have each been reduced to 0 nm. In various embodiments, in the second configuration shown in FIG. 4, the hole pattern formed by the relative positioning of the holes in the first, second, and third resonator portions 20, 22, and 24 is a generally triangular or hexagonal hole pattern that has been modified generally in accordance with a HO photonic crystal cavity hole pattern (see for example, M. Minkov and V. Savona, "Automated optimization of photonic crystal slab cavities," Scientific Reports 4, 5124 (2014)). In various embodiments, this hole pattern may provide a high quality factor and low modal volume for the photonic crystal cavity formed by the first, second, and third resonator portions 20, 22, and 24.

Referring to FIG. 4, in the configuration shown, the HO photonic crystal cavity hole pattern formed by the first, second, and third resonator portions 20, 22, and 24 is a generally triangular or hexagonal hole pattern centered around the center 26, wherein the five neighboring holes to either side of the center 26 in the x-direction and two neighboring holes to either side of the center 26 in the y-direction have been offset from a standard triangular lattice. In various embodiments, the lattice constant a for the hole pattern may be 744 nm, the hole radius r=0.24a, and the respective offsets for holes 140, 142, 144, 146, 148, 150, and 152 may be s1x=0.3a; s2x=0.199a; s3x=0.194a; s4x=0.162a; s5x=0.113a; s1y=0; s2y=0.134a, respectively. The five neighboring holes on the opposite side of the center 26 in the x-direction from the holes 140, 142, 144, 146, and 148 and the two neighboring holes on the opposite side of the center 26 in the y-direction from the holes 150 and 152 may have mirrored offsets to their counterpart holes on the other side of center. In various embodiments these variations or perturbations in the locations of holes in the otherwise periodic structure may result in an increased quality factor and/or reduced modal volume for the photonic crystal cavity.

In various embodiments, basing the configurations of the apparatus 10 on offsets applied to a resonator structure that is known to provide high Q and low V, may allow the configurations to also provide high Q and low V. In various embodiments, other photonic crystal cavity hole patterns having other variations or perturbations may be used.

Referring back to FIG. 3, in some embodiments, the location and/or shape of the first, second, and third resonator portions 20, 22, and 24 and/or the volumes 30 and 32 between the first and second resonator portions 20 and 22 and between the second and third resonator portions 22 and 24 respectively may be chosen such that $g_{om}$ is high and movement is allowed for the first and third resonator portions 20 and 24 relative to the second resonator portion 22 to change the resonant frequency while keeping the quality factor high and/or the modal volume low after the first and third resonator portions 20 and 24 have been moved.

In some embodiments, the initial separation between the first and second resonator portions 20 and 22 provided by the first volume 30 may be about 40 nm measured in the y-direction as shown in FIG. 3 such that the first resonator portion 20 may be moved toward the second resonator portion 22 up to 40 nm in the negative y-direction to make up for the starting offset of 40 nm and to reach the configuration shown in FIG. 4. In various embodiments, the separation between the second and third resonator portions 22 and 24 provided by the second volume 32 may also be about 40 nm measured in the y-direction as shown in FIG. 3 such that the third resonator portion 24 may be moved toward the second resonator portion 22 up to 40 nm in the positive y-direction to reach the configuration shown in FIG. 4.

Referring back to FIG. 3, in some embodiments, the second resonator portion 22 may include a central portion 180, a first outer portion 182 and a second outer portion 184. In various embodiments, the first and second volumes 30 and 32 may have been removed or cut from the slab 102 shown in FIG. 1 to cause the second resonator portion 22 to have the shape shown in FIG. 3.

Referring to FIG. 3, in various embodiments, the first and second outer portions 182 and 184 of the second resonator portion 22 may have respective widths between the first and second volumes 30 and 32 that increase as the first and second outer portions 182 and 184 extend from the center 26 of the resonator along a central axis 90 of the resonator. In various embodiments, the widening of the second resonator portion 22 as it extends away from the center 26 of the resonator may help the quality factor remain high and the modal volume remain low even with the presence of the volumes 30 and 32 included in the resonator and the offsets to the positioning of the first and third resonator portions 20 and 24. In various embodiments, the shape of the first and second volumes 30 and 32 may be chosen to incur minimal radiation loss, and minimal coupling of electromagnetic waves to the volumes 30 and 32.

In various embodiments, the first and third resonator portions 20 and 24 may have widths between the first volume 30 and second volume 32 respectively that increase as the first and second resonator portions extend from the center 26 of the resonator. In various embodiments, this may help the quality factor remain high and the modal volume remain low even with the volumes 30 and 32 included in the resonator.

Referring still to FIG. 3, in some embodiments, the first and second volumes 30 and 32 may include central sections 200 and 202 respectively that define edges of the central portion 180 of the second resonator portion 22. In some embodiments, the central sections 200 and 202 may extend at angles that are within a threshold angle of the central axis 90. For example, in some embodiments, the central sections 200 and 202 may extend at angles within about 30 degrees of the central axis 90. In various embodiments, the first and second volumes 30 and 32 may be shaped such that a vertex or sharp angle of the first and second volumes 30 and 32 near the center 26 of the resonator is avoided. In various embodiments, the shape of the central sections 200 and 202 may allow the quality factor to remain high and the modal volume to remain low in the resonator.

Referring still to FIG. 3, in some embodiments, outer portions of the first and second volumes 30 and 32 may each generally extend at an angle about 60 degrees from the central axis 90. In some embodiments, the angle of about 60 degrees from the central axis 90 may result in the volumes 30 and 32 generally following electric field lines produced by the hexagonal hole pattern shown in FIG. 3. In some embodiments, the outer portions of the first and second volumes 30 and 32 may include variations and may not be completely straight as they extend generally away from the center 26 of the resonator. For example, in some embodiments, the volumes 30 and 32 may include curves or waviness such that the volumes 30 and 32 follow electric field lines and/or do not intersect with holes cut in the first, second, or third resonator portions 20, 22, or 24 (see for example, FIGS. 9-13, discussed below).

In some embodiments, the first volume 30 may be generally reflection symmetric to the second volume 32 across the central axis 90 of the resonator. In various embodiments, this symmetry may facilitate a high quality factor and/or low modal volume of the resonator formed by the first, second, and third resonator portions 20, 22, and 24.

Figure 5:
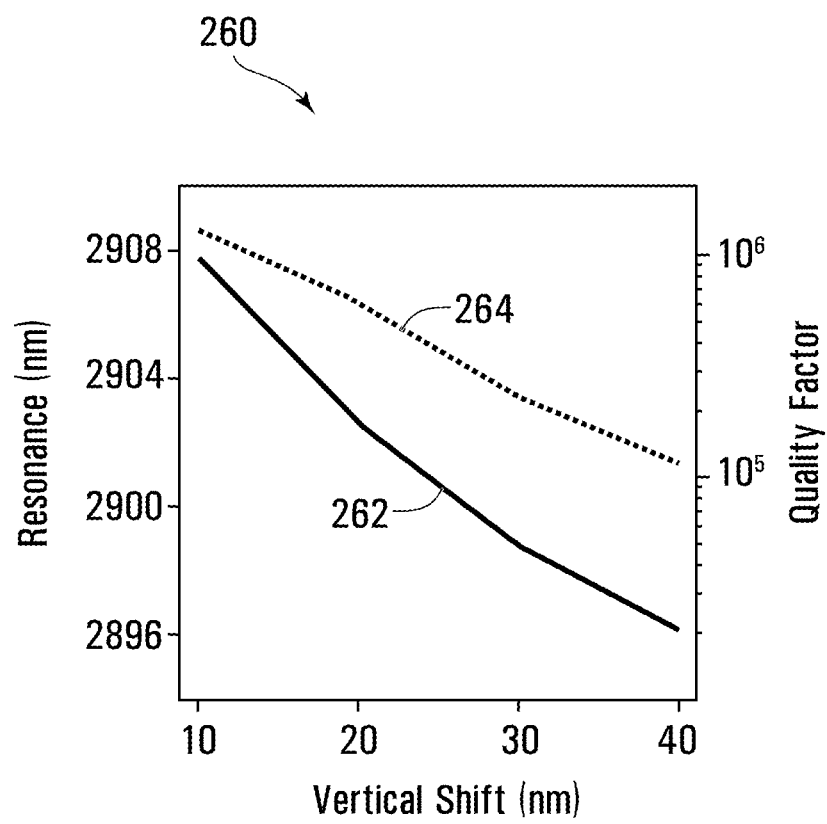
FIG. 5 is a chart showing resonance wavelength and quality factor versus vertical shift or offset for the apparatus shown in FIG. 1 in accordance with various embodiments of the invention

Referring to FIG. 5, there is provided a graph 260 showing the resonant wavelength 262 and the corresponding Q 264 of the resonator formed by the first, second, and third resonator portions 20, 22, and 24 shown in FIGS. 1-4 versus offsets in the y-direction of the first and third resonator portions 20 and 24 relative to the second resonator portion 22. The graph was generated based on simulating or modeling the first, second, and third resonator portions 20, 22, and 24 using Lumerical Finite-Difference Time-Domain ("FDTD") and COMSOL Multiphysics™ while varying offsets of the first and third resonator portions 20 and 24 relative to the second resonator portion 22 from the configuration shown in FIG. 3 having 40 nm offsets to a configuration having 10 nm offsets.

In accordance with the graph 260, in various embodiments, the shape of the first, second, and third resonator portions 20, 22, and 24 and the first and second volumes 30 and 32 shown in FIG. 3 with the first and third resonator portions 20 and 24 movable towards the configuration shown in FIG. 4 may facilitate a Q>about $1 \times 10^5$ for mid-IR wavelengths of about 2.9 μm over a range of center wavelengths that can be tuned with a $g_{om}$ of about 15 GHz/nm or about 0.35 nm wavelength shift per 1 nm spatial movement using micro-electro-mechanical (MEMS) actuators from a resonant wavelength of about 2896 nm to a resonant wavelength of at least about 2908 nm. In various embodiments, over the range of values shown in the graph 260, the modal volume V for the resonator was kept below about 0.4 $(\lambda/n)^3$.

Actuators

Referring back to FIG. 1, in various embodiments, the metal plates 40, 42, 44, and 46 acting as the first actuator coupled to the first resonator portion 20 and the second resonator portion 22 and the metal plates 48, 50, 52, and 54 acting as the second actuator coupled to the second resonator portion 22 and the third resonator portion 24 may be made of a conductive material such as, for example, gold. In some embodiments, the thickness of the metal plates 40, 42, 44, 46, 48, 50, 52, and 54 may be about 50-100 nm. In various embodiments, each of the metal plates 40-54 may be bonded to the slab 102 using physical vapor deposition, such as, for example, evaporation.

Referring still to FIG. 1, in various embodiments the metal plates 40, 42, 48, and 50 may be spaced apart from the metal plates 44, 46, 52, and 54 by respective actuator channels 60, 62, 64, and 66, each having a width of about 0.2 μm. In various embodiments, the actuator channels 60, 62, 64, and 66 may have been cut from the slab 102, for example, by dry etching. The actuator channels 60 and 62 may connect with the first volume 30 and the channels 64 and 66 may connect to the second volume 32, such that changing width of the channels 60 and 62 may change the width 34 of the first volume 30 and changing the width of the channels 64 and 66 may change the width 36 of the second volume 32.

Referring to FIG. 1, the controller 70, which may in some embodiments include a voltage source, a controlling computer or a power supply, such as, for example, a Keithley™ Series 2200 USB and GPIB Programmable DC Power Supply, may be configured to apply voltages between the metal plates 40 and 44, 42 and 46, 48 and 52, and 50 and 54. In some embodiments, the metal plates 44, 46, 48, and 50 may be connected to a common ground and the metal plates 40, 42, 52, and 54 may be connected to a common output of the controller 70.

In various embodiments, in use, the resonator formed from the first, second, and third resonator portions 20, 22, and 24 may be tested to determine its resonant frequency. For example, in some embodiments, a laser may provide input to the resonator at an input waveguide coming from the left along the central axis 90 of the resonator shown in FIG. 3 and an output may be measured from an output waveguide to the right along the axis 90 to determine the resonant frequency of the resonator.

If there is a difference between the measured resonant frequency of the resonator and a desired resonant frequency, for example, due to manufacturing error or tolerances, the controller 70 may be configured to control the first and second actuators to change the widths 34 and 36 of the first and second volumes 30 and 32 and thereby change the resonant frequency. In some embodiments, the voltage(s) applied by the controller 70 may be set by a user of the apparatus 10. In some embodiments, the controller 70 may be configured to automatically set the voltage(s) to change the widths 34 and 36 to a desired width to correct a measured resonant frequency and meet a desired resonant frequency.

Electric Field

Figure 6:
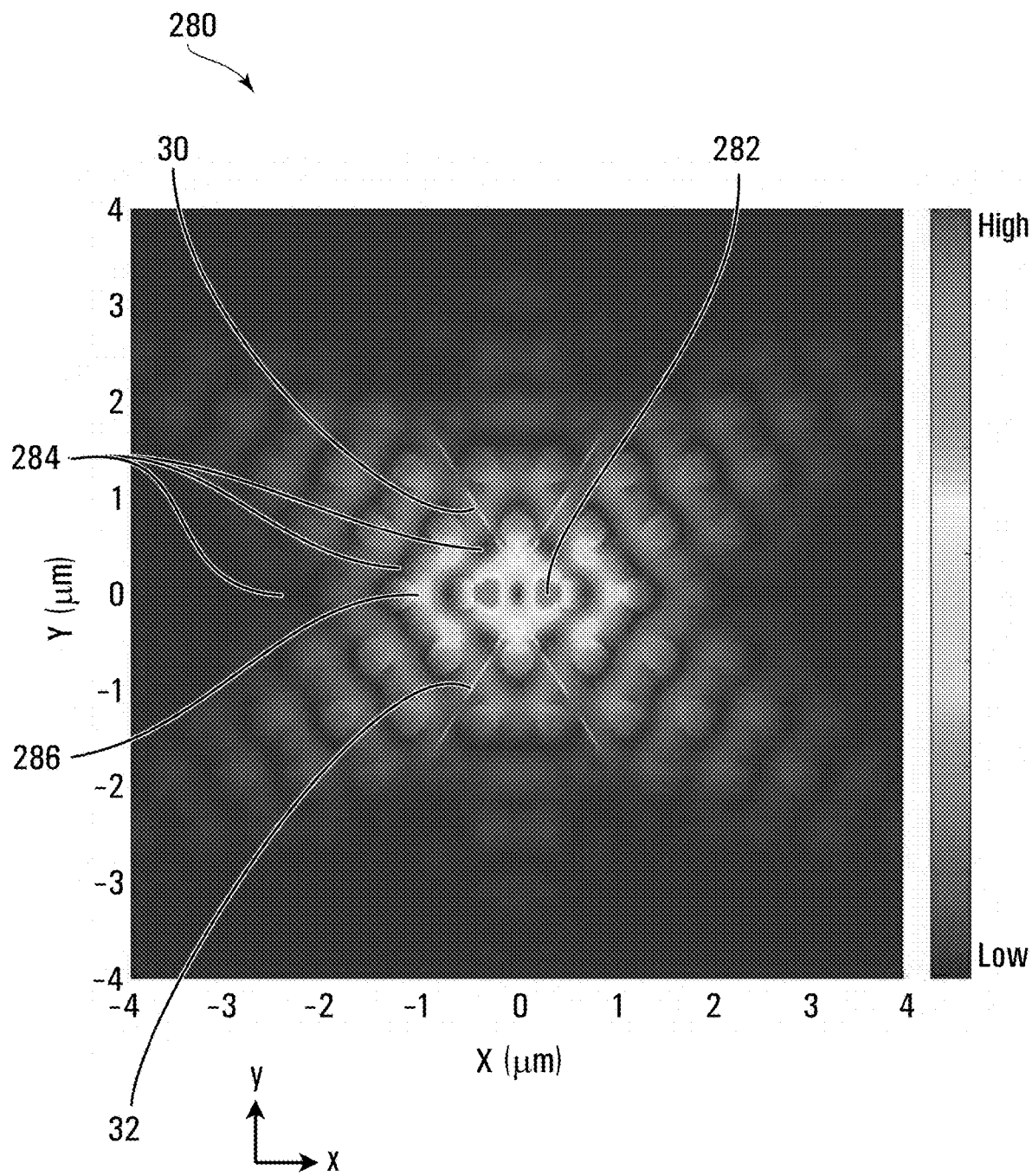
FIG. 6 is an electric field strength map showing electric field strength near a center of a resonator formed by the apparatus shown in FIG. 1 according to various embodiments of the invention.

Referring now to FIG. 6, there is shown at 280 an electric field magnitude mode profile or map (frequency domain) depicting electric field magnitudes from low to high for the photonic crystal cavity formed by the first, second, and third resonator portions 20, 22, and 24 of the apparatus 10 in the first configuration shown in FIG. 3, during resonance. Referring to FIG. 6, regions including region 282 may have a high electric field magnitude whereas regions including region 284 may have a low electric field magnitude and regions including region 286 may have a mid-level electric field magnitude.

In various embodiments, the first and second volumes 30 and 32 may be cut in shapes that are adapted to properties of the electric field in the resonator during resonance. For example, in various embodiments, the first and second volumes 30 and 32 may be formed to generally run parallel to the electric field. In various embodiments, this shape to the first and second volumes 30 and 32 may allow the quality factor to remain relatively high and/or modal volume to remain relatively low even though the slab 102 has had material removed at the volumes 30 and 32.

Manufacture

Figure 7:
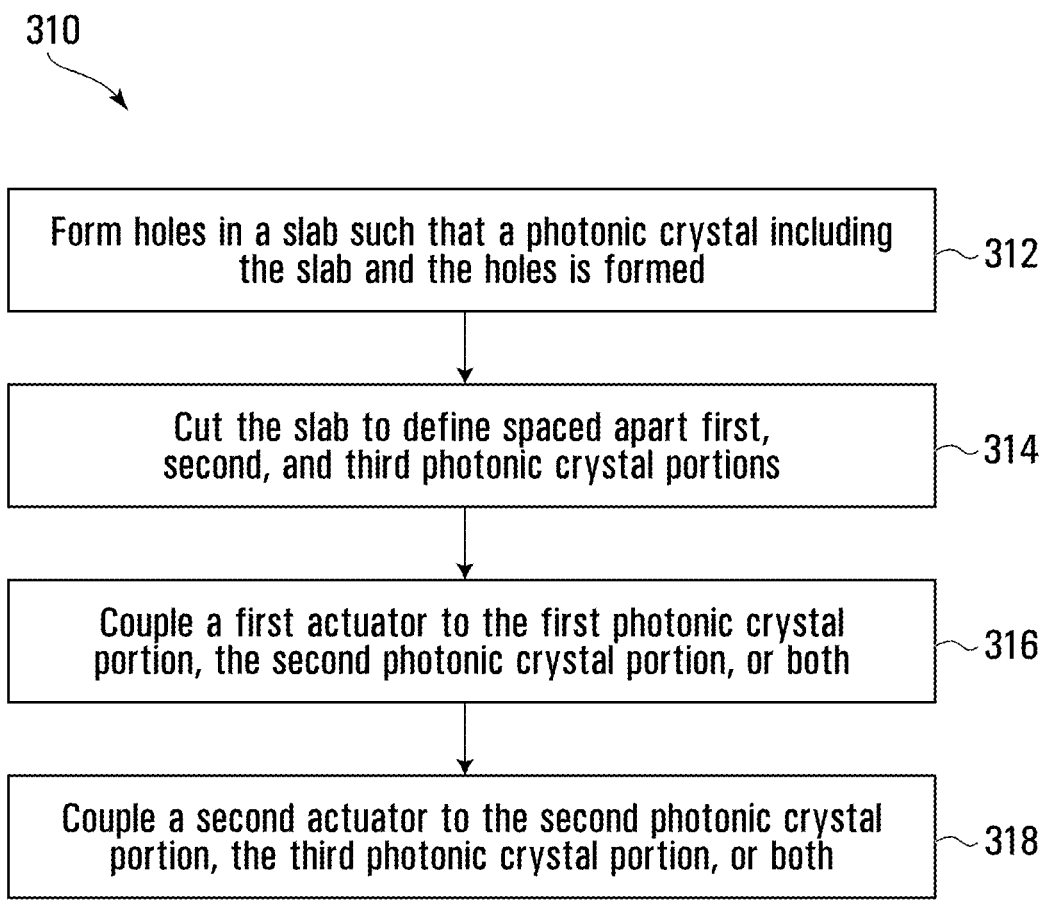
FIG. 7 is a flowchart depicting steps for manufacturing a tunable photonic crystal cavity according to various embodiments of the invention.

Referring now to FIG. 7, there is provided a flowchart 310 depicting steps for manufacturing a tunable photonic crystal cavity in accordance with various embodiments. The flowchart 310 begins with step 312 which involves forming a plurality of holes in a slab such that a photonic crystal including the slab and the plurality of holes is provided. For example, in various embodiments, step 312 may involve cutting or drilling the holes shown in FIG. 3 in the slab 102 shown in FIG. 1 to form a photonic crystal.

Step 314 involves cutting the slab 102 to define spaced apart first, second, and third photonic crystal portions of the photonic crystal. In various embodiments, step 314 may involve removing material from the slab 102 at the volumes 30 and 32 shown in FIGS. 1-3 to define the first, second, and third resonator portions 20, 22, and 24, the second resonator portion 22 disposed between the first and third resonator portions 20 and 24 to form a photonic crystal cavity having a resonant frequency. The first, second, and third resonator portions 20, 22, and 24 may act as the first, second, and third photonic crystal portions. In various embodiments, the first and second resonator portions 20 and 22 may define the first volume 30 therebetween and the second and third resonator portions may define the second volume 32 therebetween.

In various embodiments, cutting the slab to define the first, second, and third photonic crystal portions may involve cutting the slab such that the photonic crystal cavity is centered in the second photonic crystal portion.

In some embodiments, cutting the slab to define the first, second, and third photonic crystal portions may involve cutting the slab such that the second photonic crystal portion includes at least one outer portion having a width between the first and second volumes 30 and 32 that increases as the at least one outer portion extends away from a center of the photonic crystal cavity along a central axis of the photonic crystal or resonator.

In some embodiments, cutting the slab to define the first, second, and third photonic crystal portions may involve cutting the slab such that outer portions of the first and second volumes 30 and 32 each generally extend at an angle to the central axis of the photonic crystal cavity. For example, in some embodiments, the angle may be about 60 degrees.

Step 316 involves coupling a first actuator to the first photonic crystal portion, the second photonic crystal portion, or both, the first actuator configured to adjust a width of the first volume. In various embodiments, step 316 may involve coupling the first set of metal plates 40 and 42 to the first resonator portion 20 and coupling the second set of metal plates 44 and 46 to the second resonator portion 22. In various embodiments, step 316 may involve cutting the actuator channels 60 and 62 and/or cutting the first boundary volume 220 from the slab 102.

Step 318 involves coupling a second actuator to the second photonic crystal portion, the third photonic crystal portion, or both, the second actuator configured to adjust a width of the second volume. In various embodiments, step 318 may involve coupling the third set of metal plates 48 and 50 to the second resonator portion 22 and coupling the fourth set of metal plates 52 and 54 to the third resonator portion 24. In various embodiments, step 318 may involve cutting the actuator channels 64 and 66 and/or cutting the second boundary volume 222 from the slab 102.

As described above, referring to FIG. 1, the apparatus 10 may include a controller 70 configured to apply voltages to the metal plates 40-54 to decrease widths 34 and 36 of the first and second volumes 30 and 32 which may cause the resonant frequency of the resonator to be adjusted. Accordingly, the first, second, third, and fourth sets of metal plates 40-54 acting as the first and second actuators may be configured to decrease the widths of the first and second volumes to adjust the resonant frequency of the resonator.

In various embodiments, the order of the steps depicted in the flowchart 310 may be varied. For example, in some embodiments, cutting the first and second volumes 30 and 32 may be performed before the holes are formed in the slab. Accordingly, in some embodiments, steps generally similar to steps 316 and 318 may be performed before steps generally similar to steps 312 and 314.

In various embodiments, any or all of the steps 312, 314, 316, and 318 or portions thereof may be performed concurrently. For example, in some embodiments, steps 312 and 314 may be performed concurrently with any cutting performed in steps 316 and 318 and/or on some embodiments, coupling the actuators in steps 316 and 318 may be performed concurrently.

Various Embodiments

Figure 8:
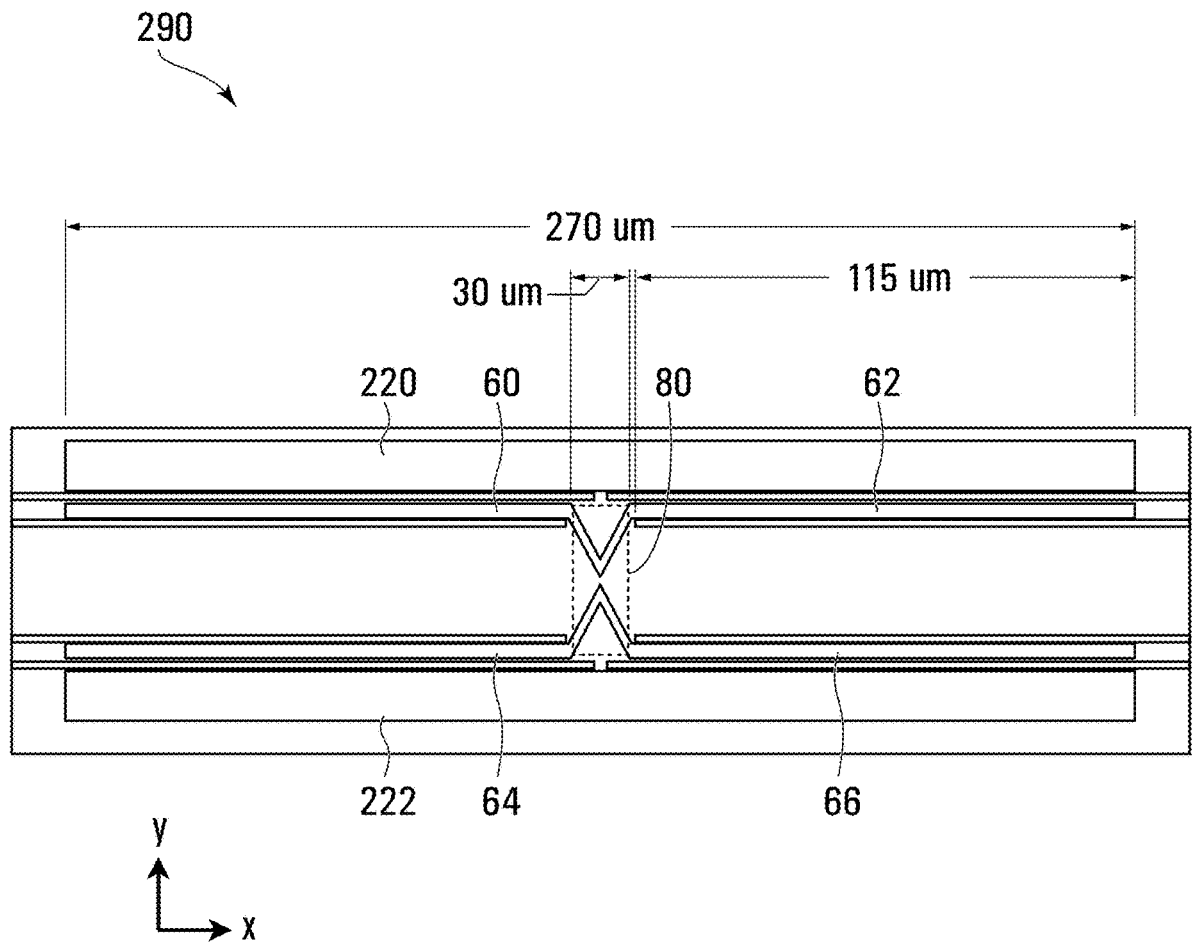
FIG. 8 is a schematic representation of the apparatus shown in FIG. 1 including dimensions according to various embodiments of the invention.

In various embodiments, the schematic representation of the apparatus 10 shown in FIG. 1 is not drawn to scale and merely provides a representation of the apparatus 10 for understanding its functionality. Referring to FIG. 8, there is provided a representation 290 of the apparatus 10 in accordance with various embodiments of the invention, wherein aspects of the slab 102 and metal plates are drawn to scale and exemplary dimensions are provided. For example, referring to FIG. 8, in various embodiments the first and second boundary volumes 220 and 222 may have lengths of about 270 µm, the region 80 may have a width of about 30 µm and the actuator channels 60, 62, 64, and 66 may have length of about 115 µm.

In various embodiments, apparatuses generally similar to the apparatus 10 shown in FIG. 1 may include resonators that differ from the resonator formed by the first, second, and third resonator portions 20, 22, and 24 shown in FIGS. 3 and 4. For example, in some embodiments, the hole pattern and/or the shape of the first and second volumes may vary.

Figure 9:
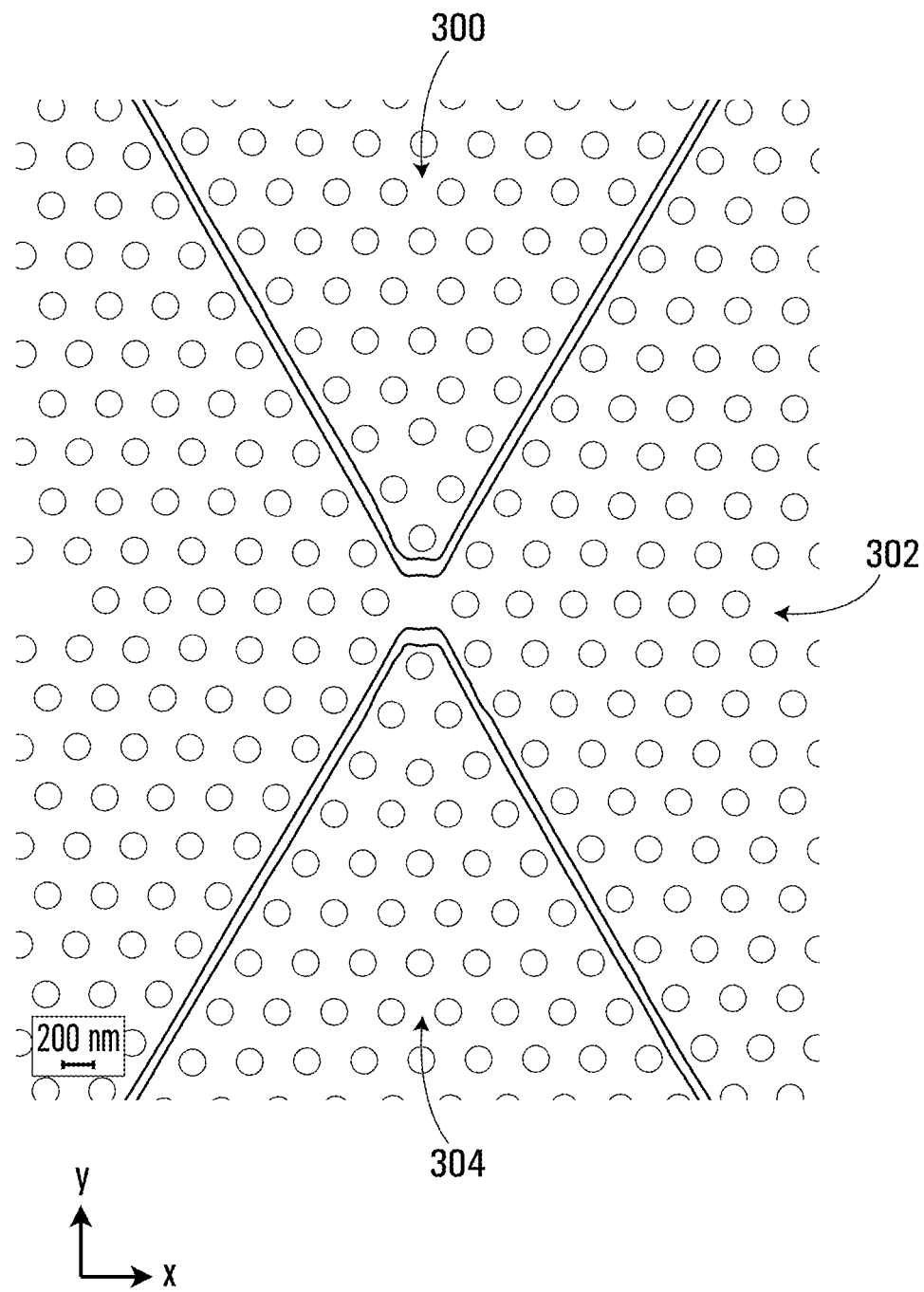
FIG. 9 is a detailed view of part of a region of an apparatus for facilitating electromagnetic wave resonator tuning according to various embodiments of the invention.
Figure 10:
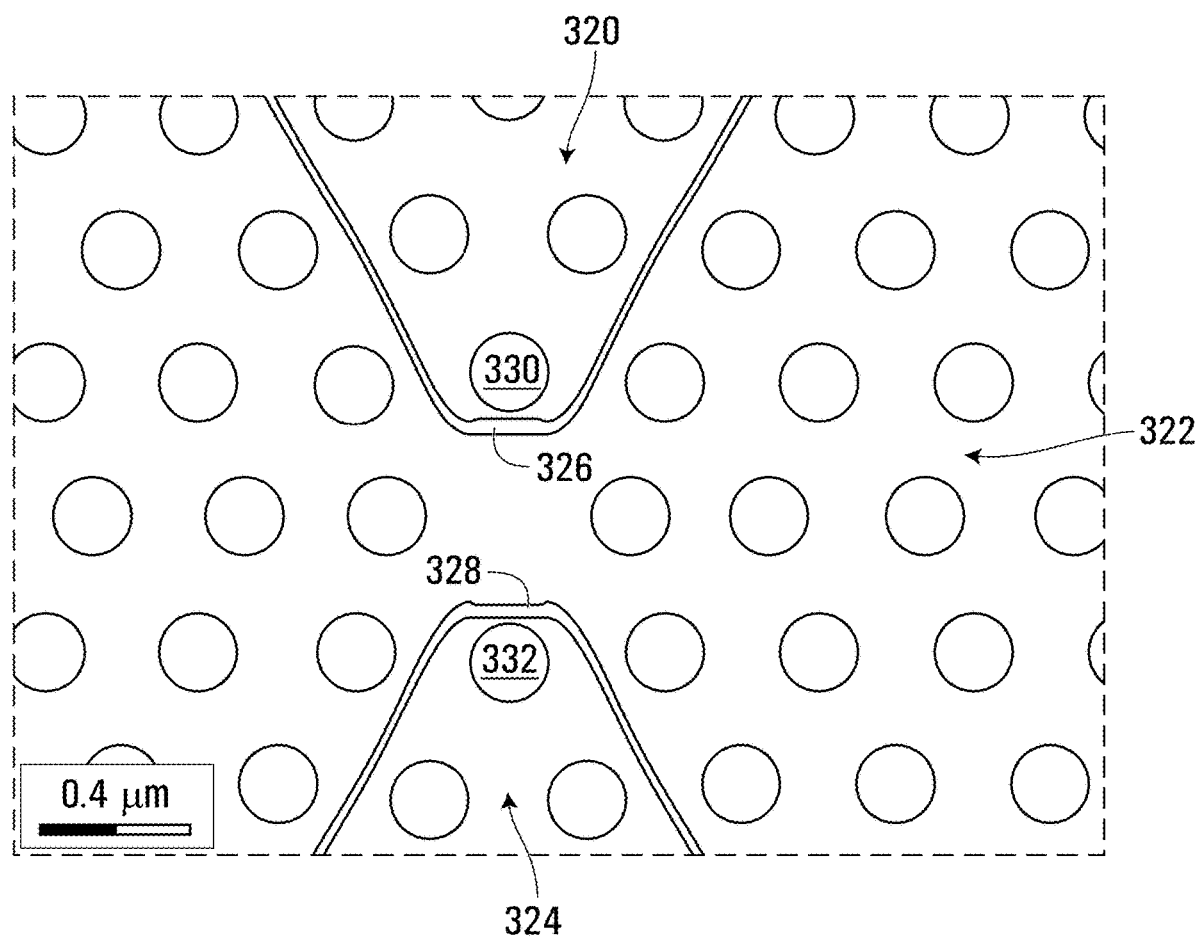
FIG. 10 is a detailed view of part of a region of an apparatus for facilitating electromagnetic wave resonator tuning according to various embodiments of the invention.
Figure 11:
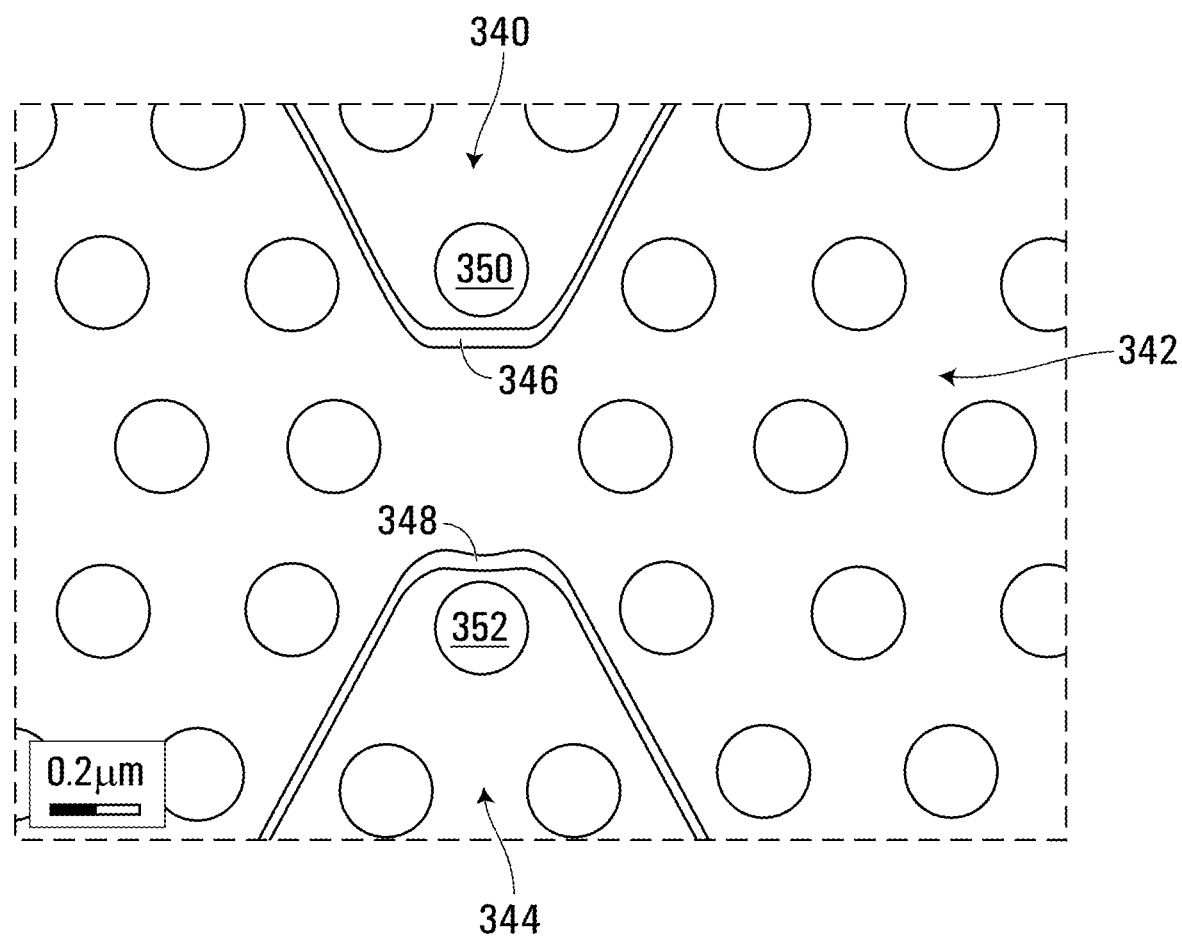
FIG. 11 is a detailed view of part of a region of an apparatus for facilitating electromagnetic wave resonator tuning according to various embodiments of the invention.
Figure 12:
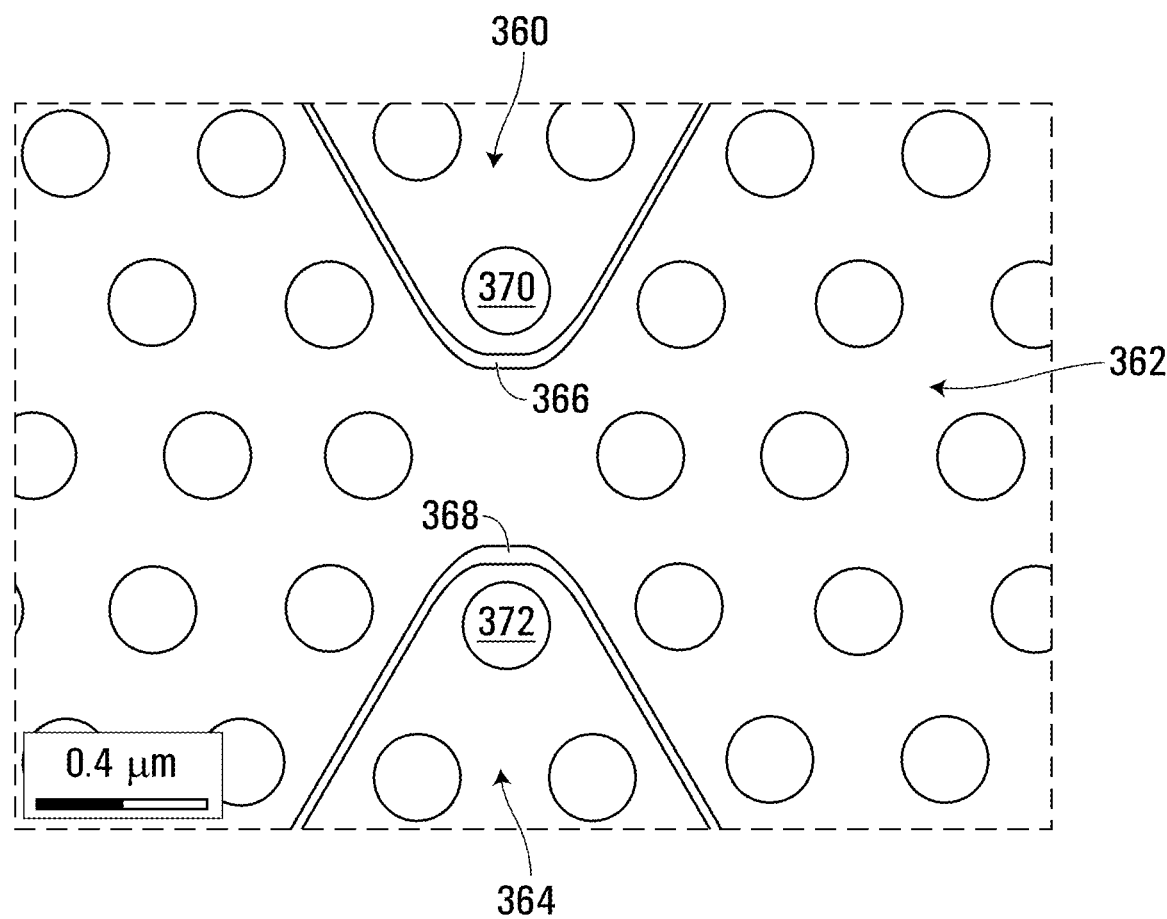
FIG. 12 is a detailed view of part of a region of an apparatus for facilitating electromagnetic wave resonator tuning according to various embodiments of the invention.
Figure 13:
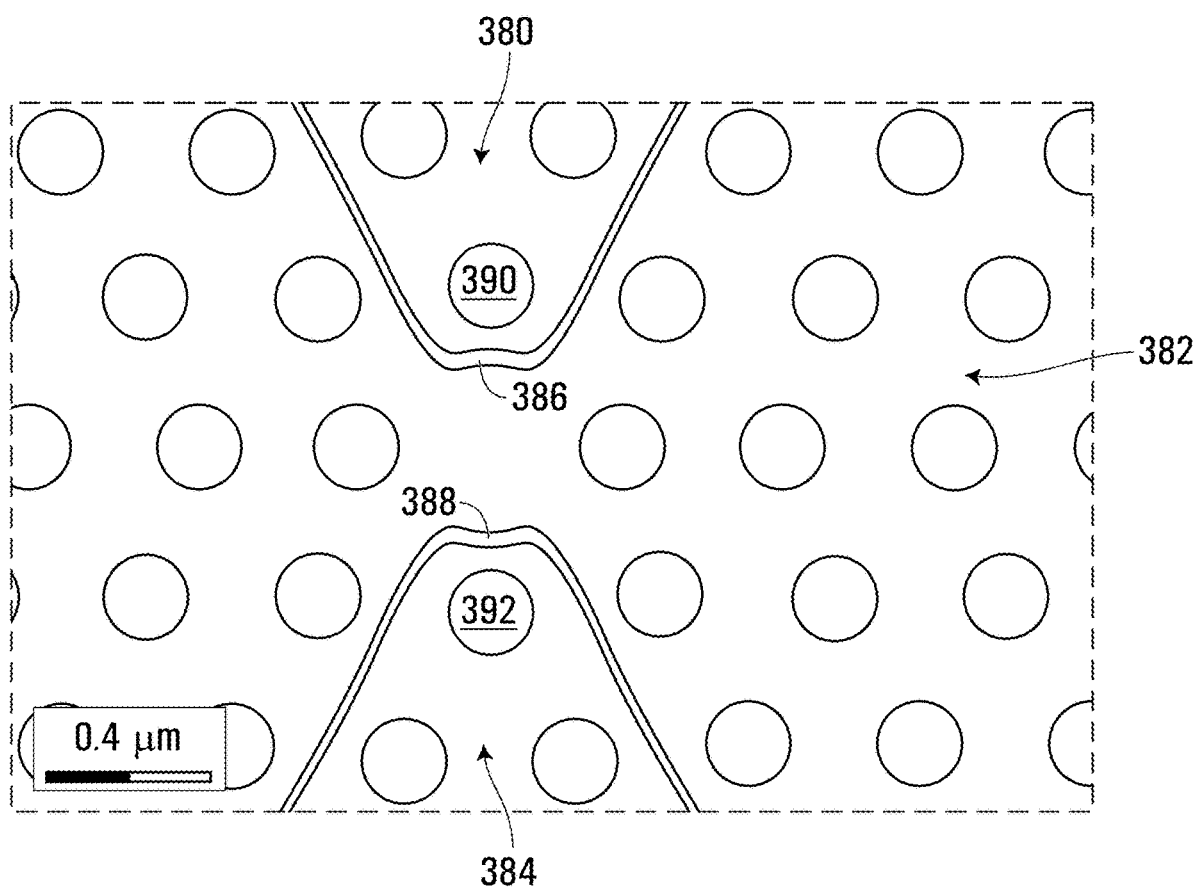
FIG. 13 is a detailed view of part of a region of an apparatus for facilitating electromagnetic wave resonator tuning according to various embodiments of the invention.

Referring now to FIG. 9, there is provided a detailed view of first, second, and third resonator portions 300, 302, and 304 of an apparatus generally similar to the apparatus 10 shown in FIG. 1, in accordance with one embodiment. In the embodiment shown in FIG. 9, the resonator formed by the first, second, and third resonator portions 300, 302, and 304 may have a resonant wavelength of about 1550 nm. Thus, in various embodiments, the resonator may be at 1550 nm communication wavelength. Referring to FIG. 9, the y-direction offset between the holes in the first and second resonator portions 300 and 302 and between the holes in the second and third resonator portions 302 and 304 may be about 100 nm and the y-direction separation between the resonator portions may be about 100 nm. In the embodiment shown in FIG. 9, the hole pattern in the configuration shown may be offset from a H0 hole pattern where the lattice constant a for the hole pattern may be 420 nm, the hole radius r=0.24a, and the respective offsets for the neighboring holes may be s1x=0.3a; s2x=0.199a; s3x=0.194a; s4x=0.162a; s5x=0.113a; s1y=0; s2y=0.134a.

In various embodiments, the apparatus including the first, second, and third resonator portions 300, 302, and 304 shown in FIG. 9 may provide a tunable photonic crystal cavity that offers Q>1×10$^6$ and V~0.4 (λ/n)$^3$ at telecommunication wavelengths.

FIGS. 10-13 provide detailed views of resonator portions and first and second volumes having different shapes in accordance with different embodiments. The hole patterns in the resonator portions shown in FIGS. 10-13 may each be based on a H0 photonic crystal cavity but offset as discussed above having regard to FIG. 3.

In various embodiments, each of the first and second volumes 326 and 328, 346 and 348, 366 and 368, and 386 and 388, separating the respective sets of first, second, and third resonator portions 320, 322, and 324; 340, 342, and 344; 360, 362, and 364; and 380, 382, and 384 shown in FIGS. 10, 11, 12, and 13, may run generally parallel to the electric field in their resonator. In various embodiments, the first and second volumes 326 and 328, 346 and 348, 366 and 368, and 386 and 388 shown in FIGS. 10, 11, 12, and 13 may each be spaced at a different distance from nearest neighbor holes 330 and 332, 350 and 352, 370 and 372, and 390 and 392.

Figure 14:
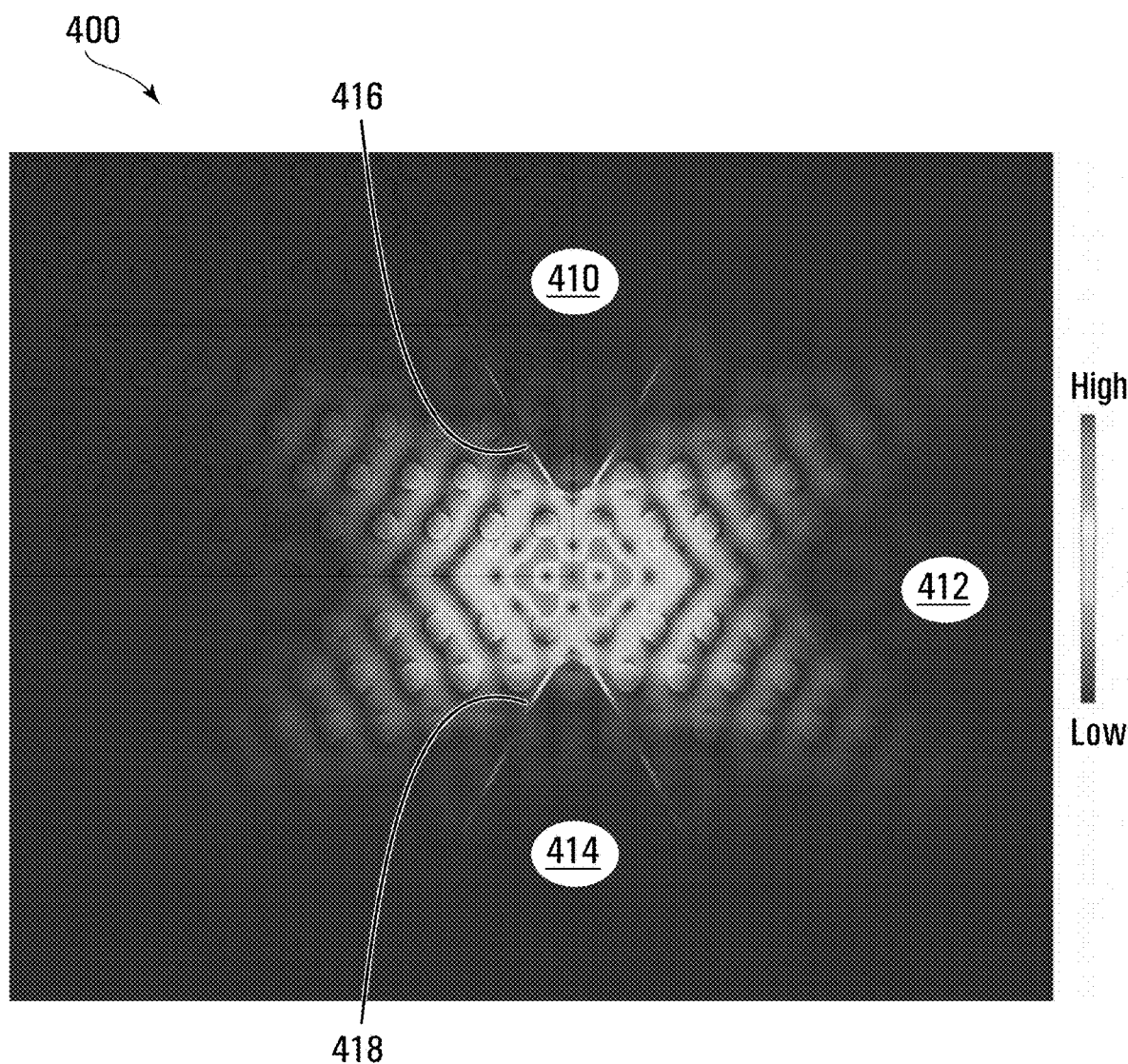
FIG. 14 is an electric field strength map showing electric field strength near a center of a resonator formed by an apparatus for facilitating electromagnetic wave resonator tuning according to various embodiments of the invention.

Referring to FIG. 14, there is shown at 400 an electric field magnitude mode profile or map (frequency domain), with an overlay showing hole positioning for the upper left quadrant of the drawing, depicting electric field magnitudes for a photonic crystal cavity formed by first, second, and third resonator portions 410, 412, and 414 and first and second volumes 416 and 418 of an apparatus generally similar to the apparatus 10 shown in FIG. 1, in accordance with another embodiment. In various embodiments, the first, second, and third resonator portions 410, 412, and 414 may have hole patterns based on an L3 photonic crystal cavity as described in M. Minkov and V. Savona, "Automated optimization of photonic crystal slab cavities," Scientific Reports 4, 5124 (2014). In various embodiments, the L3 cavity may be produced by omitting 3 central holes from a triangular lattice of holes and shifting certain neighbor holes. For example, in the embodiment shown in FIG. 14, the shifts may be as follows: s1x=0.337a, s2x=0.27a, s3x=0.088a, 54x=0.323a, s5x=0.173a.

In various embodiments, the first and second volumes 416 and 418 may extend generally parallel to the electric field lines in the resonator formed by the first, second, and third resonator portions 410, 412, and 414.

While in the embodiment shown in FIG. 1, the first and second actuators are configured to draw the first and second resonator portions 20 and 22 together and to draw the second and third resonator portions 20 and 24 together, such that the volumes 30 and 32 can be simultaneously narrowed as shown in FIGS. 2 and 4, in various embodiments, actuators coupled between the first and second resonator portions 20 and 22 and between the second and third resonator portions 22 and 24 may be configured to widen the volumes 30 and 32 by applying forces to separate the first, second, and third resonator portions. For example, in some embodiments, the initial configuration of the first, second, and third resonator portions 20, 22, and 24 may be as shown in FIG. 4 and actuators may be configured to separate the first, second, and third resonator portions 20, 22, and 24 towards the configuration shown in FIG. 3.

While various embodiments of the invention described above may include 2D photonic crystal cavity portions acting as the first, second, and third resonator portions 20, 22, and 24, in various embodiments, alternative or additional types of electromagnetic wave resonators may act as the first, second, and third resonator portions 20, 22 and 24. For example, in some embodiments, each of the first, second, and third resonator portions 20, 22, and 24 may include 3D photonic crystal portions or another type of resonator configured to resonate or confine electromagnetic waves.

While specific embodiments and examples have been described above, wherein particular resonators with particular resonant frequencies are discussed, in various embodiments, an apparatus generally similar to the apparatus 10 shown in FIGS. 1-4 may include different resonator portions and/or first and second volumes and may form a resonator having another resonant frequency other than those described herein.

In various embodiments, the apparatus 10 shown in FIGS. 1-4 may be included in a system for quantum information processing that includes a quantum information processor or quantum computer and utilizes optical non-demolition readout of quantum spin states and/or quantum entanglement, such as, for example as described in Ref. K. J. Morse, R. J. S. Abraham, A. DeAbreu, C. Bowness, T. S. Richards, H. Riemann, N. V. Abrosimov, P. Becker, H.-J. Pohl, M. L. W. Thewalt, and S. Simmons, "A photonic platform for donor spin qubits in silicon," Science Advances 3, e1700930 (2017), since the apparatus 10 is configured to provide for a high-Q and small-V photonic crystal cavity.

In various embodiments, the system for quantum information processing may include a single Se atom implanted at the center 26 of the resonator of the apparatus 10 shown in FIG. 1. An electronic spin of the Se atom may have two states: spin up (m) and spin down (g). In the absence of the cavity, if there exists a higher energy state (e) and the spin is in state (g), then the spin may absorb a photon whose energy (relating to its photon wavelength) equals the energy difference between the state g and e, and be excited to the state e, while if the spin is in (m) state, it may not absorb the photon.

Consider the spin mentioned above inside the resonator of the apparatus 10, with the g-e transition on resonance with the resonator. If the spin is in (g) state and the resonator has high Q, the system (spin+resonator) may be in a regime called strong coupling, in which the system resonance will be modified (split into a higher and lower value with respect to the original resonance and in various embodiments, the smaller the V, the farther it splits). If a laser that is on resonance with the (bare) resonator is incident on the described system, it will be reflected. On the other hand, if the spin is in (m) state, the spin and the resonator may not couple, and the laser will only "see" the bare resonator and thus be transmitted. Therefore, in various embodiments, the quantum spin states can be measured by measuring the laser transmission.

In various embodiments, additional or alternative actuators to the first and second actuators described above may be coupled to the first resonator portion 20, the second resonator portion 22, or both and/or to the second resonator portion 22, the third resonator portion 24, or both to facilitate increasing or decreasing the width of the volumes 30 and 32. For example, in various embodiments, other MEMS actuators may be used, such as, one or more comb drives, and/or one or more folded beam actuator, for example.

Figure 15:
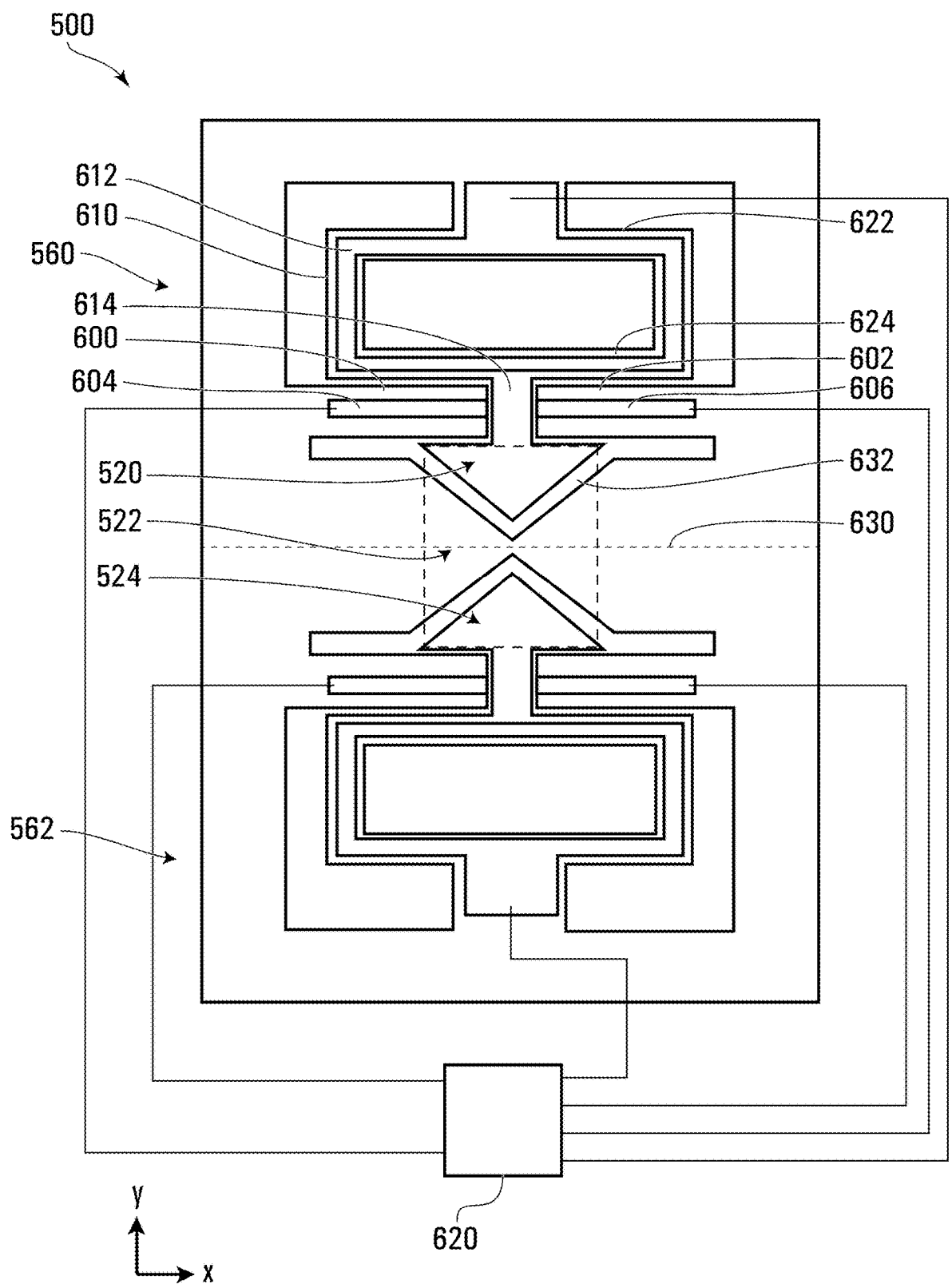
FIG. 15 is a schematic representation of an apparatus for facilitating electromagnetic wave resonator tuning according to various embodiments of the invention.

Referring to FIG. 15, there is provided a schematic representation of an apparatus 500 for facilitating electromagnetic resonator tuning, in accordance with various embodiments. In various embodiments, the apparatus 500 may include generally similar elements and function generally similarly to the apparatus 10 shown in FIG. 1 and described above.

Referring to FIG. 15, the apparatus 500 includes first, second, and third spaced apart resonator portions 520, 522, and 524 forming a resonator. The apparatus 500 also includes a first actuator 560 coupled to the first resonator portion 520 and a second actuator 562 coupled to the third resonator portion 524. In various embodiments, the first actuator 560 may be configured to move the first resonator portion 520 relative to the second resonator portion 522 and may be considered to be coupled between the first resonator portion 520 and second resonator portion 522. In various embodiments, the second actuator 562 may be configured to move the third resonator portion 524 relative to the second resonator portion 522 and may be considered to be coupled between the second resonator portion 522 and third resonator portion 524.

Referring to FIG. 15, in various embodiments, the first actuator 560 may include first and second anchored portions 600 and 602 having first and second metal plates 604 and 606 bonded thereto. In various embodiments, the anchor portions 600 and 602 may be rigidly coupled to a common anchor to which the second resonator portion is also anchored and so the first and second anchored portions 600 and 602 may be coupled to the second resonator portion 522. In some embodiments, the anchored portions 600 and 602 may be integral with and adjacent to the substrate that forms the second resonator portion 522.

The first actuator 560 also includes a first deformable or foldable portion 610 having a third metal plate 612 bonded thereto. In various embodiments, the first deformable portion 610 may include first deformable beams 622 and 624 transversely spaced apart, coupled together, and extending generally parallel to a central axis 630 of the resonator. The first deformable portion 610 may be coupled to the first resonator portion 520 via a connecting portion 614, such that deformation of the first deformable portion 610 is configured to adjust a width of a first volume 632 between the first and second resonator portions 520 and 522. In some embodiments, the first deformable portion may be integral with the connecting portion 614 and the first resonator portion 520.

In various embodiments, because the beams 622 and 624 run parallel to the central axis 630, the beams may be more easily deformable to move the first resonator portion 520 towards or away from the central axis 630 and thereby adjust the width of the first volume 632. In various embodiments, use of a plurality of the beams 622 and 624 transversely spaced apart, which may be overlapping and generally parallel to one another in some embodiments, may facilitate use of shorter beams and thus a smaller width of the actuator measured along the central axis 630 of the resonator than can be achieved using a single beam, as shown in FIGS. 1, 2, and 9, for example, which may be desirable for reducing manufacturing costs in some embodiments. In various embodiments, the shorter beams may also reduce risk of the attractive force of the metal plates rotating the beams out of plane. In various embodiments, additional beams coupled to, transversely spaced apart from, and generally aligned with the beams 622 and 624 may be included in the first actuator 560 to improve deformability.

In some embodiments, the first deformable portion 610 may be formed by cutting sections out of a single substrate slab and so the first deformable portion 610 may be integral with the first, second, and third resonator portions 520, 522, and 524. In various embodiments, forming the deformable portion 610 from a single integral substrate with the first, second, and third resonator portions may facilitate manufacturability of the apparatus 500.

In operation, a voltage difference or electrostatic charge difference may be applied between the third metal plate 612 and the first and second metal plates 604 and 606, to cause the third metal plate 612 to be attracted to the first and second metal plates 604 and 606. In operation, this may cause the foldable portion 610 to fold or deform and thereby move the first resonator portion 520 relative to the second resonator portion 522.

For example, in some embodiments, the apparatus 500 may include a controller 620 configured to apply a control voltage to the first and second metal plates 604 and 606 while tying the third metal plate 608 to ground to cause the foldable portion 610 to fold or deform and thereby move the first resonator portion 520 relative to the second resonator portion 522.

Referring to FIG. 15, the second actuator 562 may include elements generally similar to those described above having regard to the first actuator 560.

In various embodiments, use of the first and second actuators 560 and 562 may facilitate movement of the first and third resonator portions 520 and 524, respectively, relative to the second resonator portion 522 to vary widths of volumes between the first resonator portion 520 and the second resonator portion 522 and between the second resonator portion 522 and the third resonator portion 524. In various embodiments, this may cause the resonant frequency of a resonator formed by the first, second, and third resonator portions 520, 522, and 524 to be adjusted.

In some embodiments, the first and second actuators 560 and 562 of the apparatus 500 shown in FIG. 15 may be well suited to a resonator as shown in FIGS. 1 and 15 wherein the first and third resonator portions are generally triangle shaped and a width of the resonator is relatively small, for example and so reducing a width of the actuators may result in a lower overall width of the apparatus 500.

Figure 16:
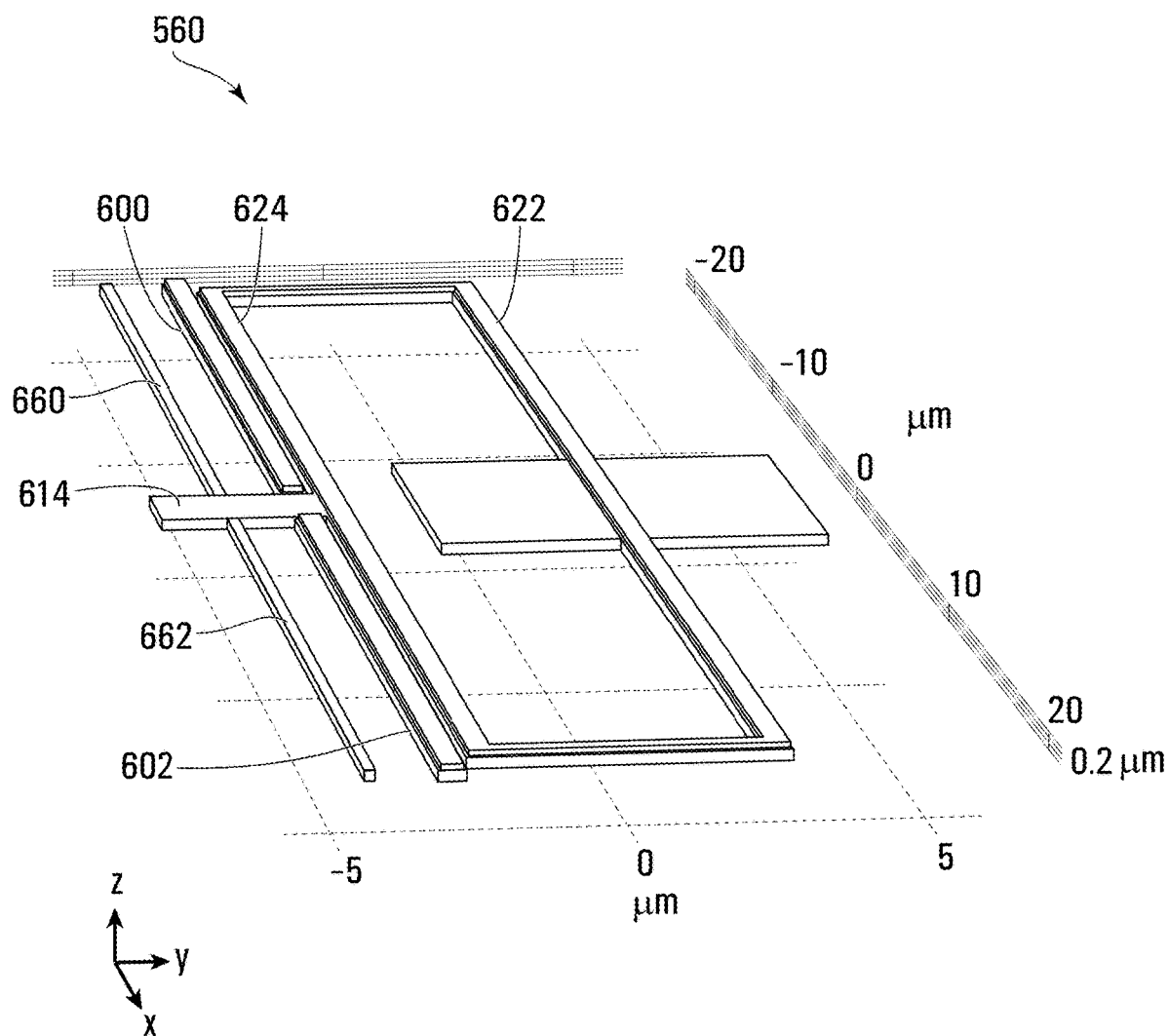
FIG. 16 is a perspective view of a portion of a first actuator of the apparatus shown in FIG. 15 according to various embodiments of the invention.

Referring now to FIG. 16, there is shown a perspective scale view of a portion of the first actuator 560 of the apparatus 500 shown in FIG. 15, in accordance with various embodiments. In the embodiment shown in FIG. 15, the first actuator 560 includes aligners 660 and 662 coupled to the connecting portion 614 at one end and coupled to the boundary of the slab at the other end (not shown in FIG. 16). In various embodiments, the aligners 660 and 662 may be integral with the slab and the connecting portion 614. In some embodiments, the aligners 660 and 662 may help to keep the connecting portion and thus the first resonator portion from moving in the x-direction during deformation or actuation of the first actuator 560. In some embodiments, the aligners 660 and 662 may act as deformable beams configured to deform to facilitate movement of the first resonator portion during actuation of the first actuator 560.

In various embodiments, the steps depicted by the flowchart 310 shown in FIG. 7 may be adapted for manufacture of the apparatus 500 shown in FIG. 15 or another generally similar apparatus.

In various embodiments, the metal plates included in the actuators described herein may be omitted and the regions where the metal plates are shown may be selectively doped with conductive or metallic materials to facilitate the actuators functioning as described herein. For example, in some embodiments, boron may be doped in silicon in the regions where metal plates are shown to make those regions of silicon conductive. In various embodiments, the conductivity may depend on the doping level (concentration) which may be adjustable.

Figure 17:
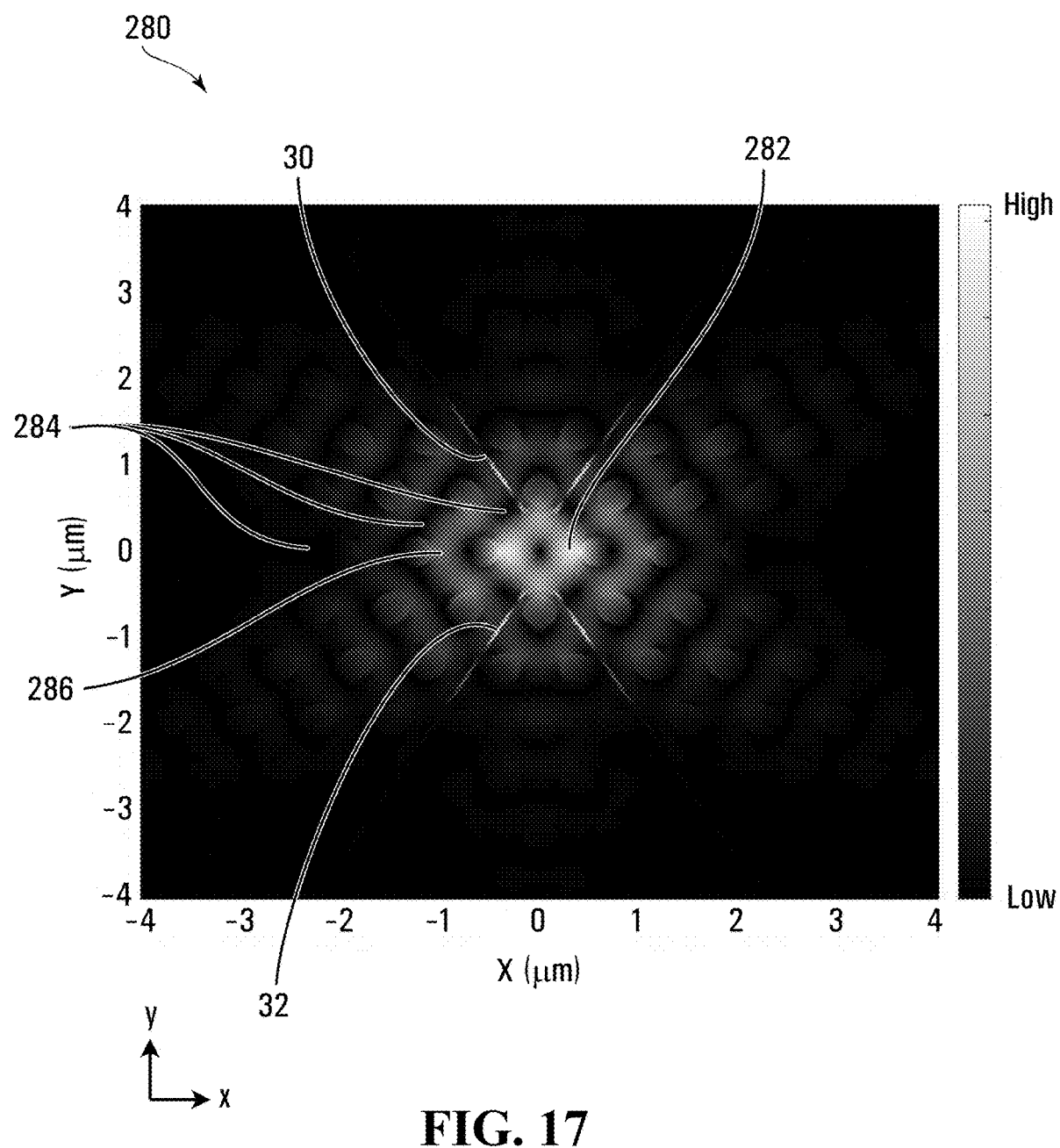
FIG. 17 is an alternative grayscale representation of the electric field magnitude mode profile or map (frequency domain) shown in FIG. 6.
Figure 18:
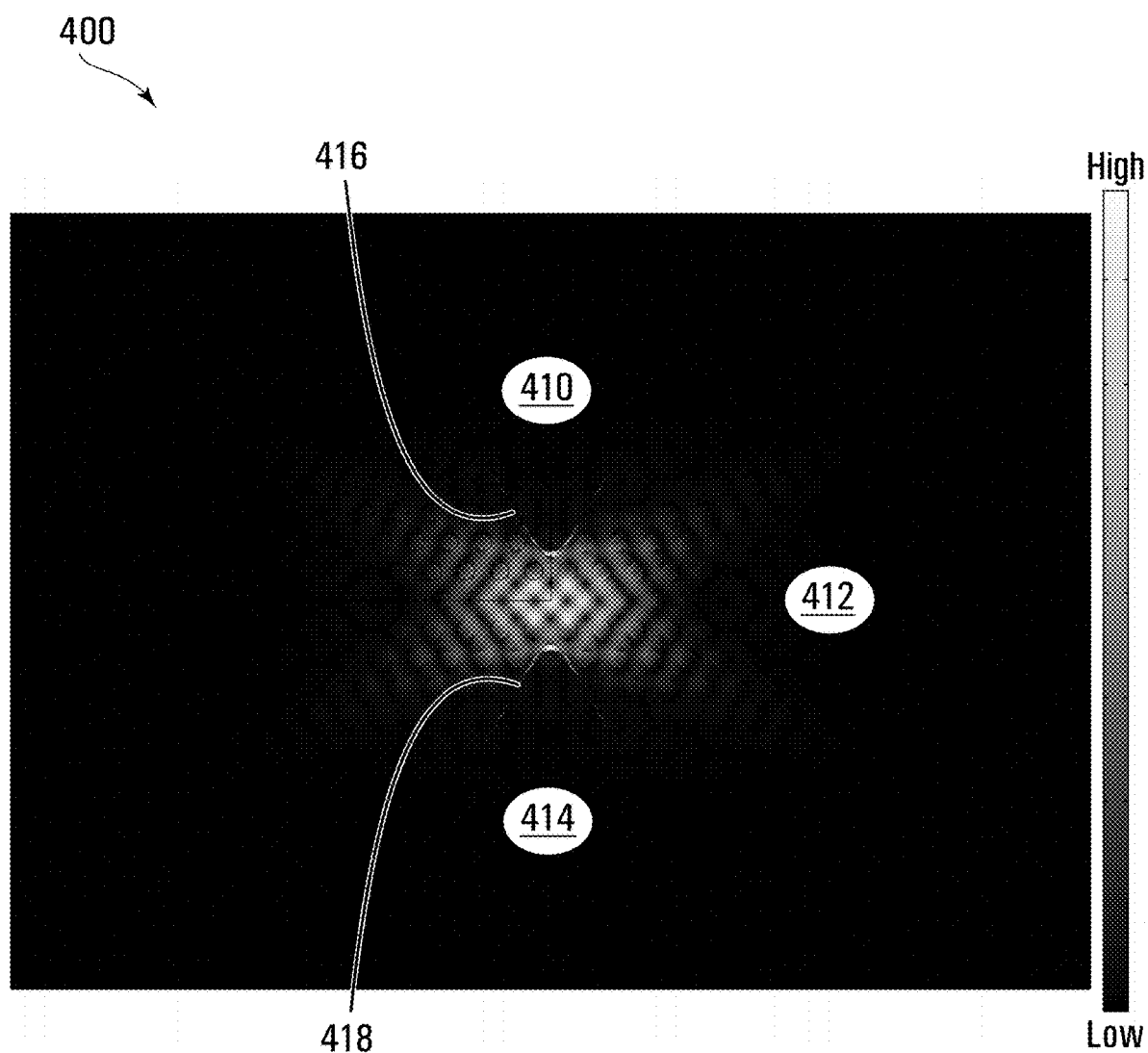
FIG. 18 is an alternative grayscale representation of the electric field magnitude mode profile or map (frequency domain) shown in FIG. 14.

Referring to FIG. 17, there is provided an alternative grayscale representation of the electric field magnitude mode profile or map (frequency domain) 280 shown in FIG. 6 where low electric field magnitude is shown as dark and high electric field magnitude is shown as light. Referring to FIG. 18 there is provided an alternative grayscale representation of the electric field magnitude mode profile or map (frequency domain) 400 shown in FIG. 14 where low electric field magnitude is shown as dark and high electric field magnitude is shown as light.

While specific embodiments of the invention have been described and illustrated, such embodiments should be considered illustrative of the invention only and not as limiting the invention as construed in accordance with the accompanying claims.

The invention claimed is:

1. An apparatus for facilitating electromagnetic wave resonator tuning, the apparatus comprising:
   first, second, and third spaced apart resonator portions, the second resonator portion disposed between the first and third resonator portions to form an electromagnetic wave resonator having a resonant frequency, wherein the first and second resonator portions define a first volume therebetween and the second and third resonator portions define a second volume therebetween;
   a first actuator coupled to the first resonator portion, the second resonator portion, or both, the first actuator configured to adjust a width of the first volume; and a second actuator coupled to the second resonator portion, the third resonator portion, or both, the second actuator configured to adjust a width of the second volume;

wherein the first and second actuators are configured to decrease the widths of the first and second volumes or increase the widths of the first and second volumes to adjust the resonant frequency of the resonator.

2. The apparatus of claim 1 wherein the resonator is centered in the second resonator portion.

3. The apparatus of claim 1 wherein the second resonator portion includes at least one outer portion having a width between the first and second volumes that increases as the at least one outer portion extends away from a center of the resonator along a central axis of the resonator.

4. The apparatus of claim 3 wherein outer portions of the first and second volumes each generally extend at an angle to the central axis of the resonator.

5. The apparatus of claim 4 wherein the angle is about 60 degrees.

6. The apparatus of claim 3 wherein the first actuator comprises a first deformable portion including a plurality of transversely spaced apart deformable beams coupled together and extending generally parallel with the central axis of the resonator and the second actuator comprises a second deformable portion including a plurality of transversely spaced apart deformable beams coupled together and extending generally parallel with the central axis of the resonator.

7. The apparatus of claim 6 wherein the first deformable portion is coupled to the first resonator portion and the second deformable portion is coupled to the second resonator portion such that deformation of the first deformable portion is configured to adjust the width of the first volume and deformation of the second deformable portion is configured to adjust the width of the second volume.

8. The apparatus of claim 6 wherein the first and second deformable portions are integral with the first, second, and third resonator portions.

9. The apparatus of claim 3 wherein the first volume is generally reflection symmetric to the second volume across the central axis of the resonator.

10. The apparatus of claim 1 wherein the first, second, and third resonator portions are first, second, and third photonic crystal portions and wherein the resonator is a photonic crystal cavity.

11. The apparatus of claim 10 wherein the first, second, and third photonic crystal portions are 2D photonic crystal portions.

12. The apparatus of claim 1 wherein a single integral slab of substrate material includes the first, second, and third resonator portions.

13. The apparatus of claim 12 wherein the apparatus includes:

a first boundary portion spaced apart from the first resonator portion and defining a first boundary volume therebetween; and a second boundary portion spaced apart from the third resonator portion and defining a second boundary volume therebetween; and wherein the first and second boundary portions are integral with the slab of substrate material.

14. The apparatus of claim 1 wherein the first actuator is coupled between the first and second resonator portions and the second actuator is coupled between the second and third resonator portions.

15. A system for quantum information processing comprising a quantum information processor and the apparatus of claim 1.

16. A method of manufacturing a tunable photonic crystal cavity, the method comprising:

forming a plurality of holes in a slab such that a photonic crystal comprising the slab and the plurality of holes is provided;

cutting the slab to define spaced apart first, second, and third photonic crystal portions of the photonic crystal, the second photonic crystal portion disposed between the first and third photonic crystal portions to form a photonic crystal cavity having a resonant frequency, wherein the first and second photonic crystal portions define a first volume therebetween and the second and third photonic crystal portions define a second volume therebetween;

coupling a first actuator to the first photonic crystal portion, the second photonic crystal portion, or both, the first actuator configured to adjust a width of the first volume; and coupling a second actuator to the second photonic crystal portion, the third photonic crystal portion, or both, the second actuator configured to adjust a width of the second volume;

wherein the first and second actuators are configured to decrease the widths of the first and second volumes or increase the widths of the first and second volumes to adjust the resonant frequency of the photonic crystal cavity.

17. The method of claim 16 wherein cutting the slab to define the first, second, and third photonic crystal portions, comprises cutting the slab such that the photonic crystal cavity is centered in the second photonic crystal portion.

18. The method of claim 17 wherein cutting the slab to define the first, second, and third photonic crystal portions comprises cutting the slab such that the second photonic crystal portion includes at least one outer portion having a width between the first and second volumes that increases as the at least one outer portion extends away from a center of the photonic crystal cavity along a central axis of the photonic crystal cavity.

19. The method of claim 18 wherein cutting the slab to define the first, second, and third photonic crystal portions comprises cutting the slab such that outer portions of the first and second volumes each generally extend at an angle to the central axis of the photonic crystal.

20. The method of claim 19 wherein the angle is about 60 degrees.

* * * * *